(12) United States Patent
Hyodo et al.

(10) Patent No.: US 11,391,017 B2
(45) Date of Patent: Jul. 19, 2022

(54) WHEEL LOADER

(71) Applicant: Hitachi Construction Machinery Co., Ltd., Tokyo (JP)

(72) Inventors: Koji Hyodo, Kasumigaura (JP); Isamu Aoki, Tsukuba (JP); Tetsuji Tanaka, Abiko (JP); Masaki Nukii, Ushiku (JP)

(73) Assignee: Hitachi Construction Machinery Co., Ltd., Tokyo (JP)

(*) Notice: Subject to any disclaimer, the term of this patent is extended or adjusted under 35 U.S.C. 154(b) by 285 days.

(21) Appl. No.: 16/641,462

(22) PCT Filed: Sep. 4, 2018

(86) PCT No.: PCT/JP2018/032784
§ 371 (c)(1),
(2) Date: Feb. 24, 2020

(87) PCT Pub. No.: WO2019/065123
PCT Pub. Date: Apr. 4, 2019

(65) Prior Publication Data
US 2020/0199852 A1 Jun. 25, 2020

(30) Foreign Application Priority Data
Sep. 29, 2017 (JP) .............................. JP2017-191677

(51) Int. Cl.
*E02F 9/22* (2006.01)
*F16H 61/47* (2010.01)
(Continued)

(52) U.S. Cl.
CPC .......... *E02F 9/2253* (2013.01); *E02F 9/2235* (2013.01); *E02F 9/2289* (2013.01);
(Continued)

(58) Field of Classification Search
CPC .............................. F16H 61/47; E02F 9/2253
See application file for complete search history.

(56) References Cited

U.S. PATENT DOCUMENTS 6,272,950 B1 * 8/2001 Braun ................... F16H 61/462
74/731.1
8,532,886 B1 * 9/2013 Shirao ................... F16H 61/433
701/50
(Continued)

FOREIGN PATENT DOCUMENTS

EP 3 093 397 A1 11/2016
JP 10-184906 A 7/1998
(Continued)

OTHER PUBLICATIONS

International Search Report (PCT/ISA/210) issued in PCT Application No. PCT/JP2018/032784 dated Nov. 13, 2018 with English translation (five pages).
(Continued)

*Primary Examiner* — Thomas E Lazo
(74) *Attorney, Agent, or Firm* — Crowell & Moring LLP

(57) ABSTRACT

A wheel loader is provided that can suppress abrupt change in vehicle speed accompanied by erroneous determination on a lift arm lifting operation. A wheel loader includes: an engine; an HST pump; an HST motor; a forward and reverse switch; a stepping amount sensor; an operation amount sensor; and a controller. The controller determines whether a specific condition for specifying an operation of the lift arm in an upper direction during forward travel of the vehicle body, on the basis of a forward and reverse switching signal, the stepping amount, and a pilot pressure pertaining to the lifting operation for the lift arm. In a case of the specific condition being satisfied, the vehicle speed is lim-
(Continued)

ited by controlling the displacement volume of the HST motor in conformity with increase in the pilot pressure.

5 Claims, 21 Drawing Sheets

(51) Int. Cl.
*E02F 3/43* (2006.01)
*E02F 9/26* (2006.01)

(52) U.S. Cl.
CPC ............ *E02F 9/2296* (2013.01); *F16H 61/47* (2013.01); *E02F 3/431* (2013.01); *E02F 9/2246* (2013.01); *E02F 9/265* (2013.01)

(56) References Cited

U.S. PATENT DOCUMENTS

| | | | | |
|---|---|---|---|---|
| 8,666,610 B2* | 3/2014 | Shirao | ............ | F15B 11/08 |
| | | | | 701/50 |
| 8,769,945 B2* | 7/2014 | Shirao | ............ | F16H 61/438 |
| | | | | 60/488 |
| 2010/0032219 A1* | 2/2010 | Udagawa | ............ | B60L 50/61 |
| | | | | 60/431 |
| 2010/0131158 A1* | 5/2010 | Saito | ............ | E02F 9/2079 |
| | | | | 701/50 |
| 2010/0332061 A1* | 12/2010 | Forslow | ............ | E02F 9/2045 |
| | | | | 701/50 |
| 2012/0010790 A1* | 1/2012 | Kanayama | ............ | E02F 9/2217 |
| | | | | 701/50 |
| 2013/0259619 A1 | 10/2013 | Shirao | | |
| 2016/0326720 A1* | 11/2016 | Uno | ............ | E02F 3/431 |
| 2019/0010679 A1 | 1/2019 | Takeda et al. | | |

FOREIGN PATENT DOCUMENTS

| | | |
|---|---|---|
| JP | 2009-30693 A | 2/2009 |
| JP | 2010-25179 A | 2/2010 |
| JP | 2015-94070 A | 5/2015 |
| JP | 2017-166587 A | 9/2017 |
| WO | WO 2009/019974 A1 | 2/2009 |
| WO | WO 2010/110086 A1 | 9/2010 |
| WO | WO 2013/145342 A1 | 10/2013 |
| WO | WO 2015/068545 A1 | 5/2015 |

OTHER PUBLICATIONS

Japanese-language Written Opinion (PCT/ISA/237) issued in PCT Application No. PCT/JP2018/032784 dated Nov. 13, 2018 (five pages).

* cited by examiner

SPOOL STROKE AMOUNT PERTAINING TO LIFT ARM [%]

WHEEL LOADER

TECHNICAL FIELD

The present invention relates to a wheel loader equipped with a variable-speed travel drive system.

BACKGROUND ART

As variable-speed travel drive systems, for example, an HST or HMT system that converts a hydraulic pressure caused by an engine driving a hydraulic pump, into torque, through a hydraulic motor, and an EMT system that converts an electric power generated by an engine driving a generator, into torque, through an electric motor, have been known.

For example, Patent Literature 1 discloses a wheel loader that includes: an operation device that includes a lift arm rotatable in the vertical direction; a hydraulic closed circuit that includes a variable displacement HST pump driven by an engine, and an HST motor driven by pressurized oil discharged from the HST pump; and a working device pump that is driven by the engine to discharge the pressurized oil for operating the operation device.

The wheel loader can select, as an operation mode, either of a power mode that supports heavy earthwork, and an economy mode that reduces the number of engine revolutions in comparison with the power mode to reduce fuel consumption. When a lift arm lifting operation is detected by detecting the lift arm cylinder bottom pressure in the economy mode being selected as the operation mode, a travel drive system increases the number of engine revolutions in comparison with that in the economy mode. Accordingly, even during operation in the economy mode, the lift arm lifting operation rate is resistant to reduction, and the operation efficiency of the wheel loader is improved.

CITATION LIST

Patent Literature

Patent Literature 1: Japanese Patent Laid-Open No. 2015-94070

SUMMARY OF INVENTION

Technical Problem

However, the wheel loader described in Patent Literature 1 determines presence or absence of the lift arm lifting operation using the lift arm cylinder bottom pressure. Accordingly, for example, when a load is in a bucket even with the lift arm lifting operation being not performed (an operating lever being in a neutral state), the lift arm cylinder bottom pressure is high, and it is possibly, erroneously determined that the lift arm lifting operation is being performed. In a case where the wheel loader travels on an irregular road surface in an opencast mine or the like, the vehicle body vibrates, which tends to vary the lift arm cylinder bottom pressure. Accordingly, this case is also vulnerable to erroneous determination that the lift arm lifting operation is being performed.

As described above, even in situations where an operator does not intentionally perform the lift arm lifting operation, increase in the number of engine revolutions due to erroneous determination on the lift arm lifting operation abruptly changes the vehicle speed, which possibly, further applies vibrations and impacts to the vehicle body and the operator.

Accordingly, the present invention has an object to provide a wheel loader that can suppress abrupt change in vehicle speed accompanied by erroneous determination on the lift arm lifting operation.

Solution to Problem

To achieve the object described above, a wheel loader is provided that is a wheel loader including a front working device including a lift arm provided at a front of a vehicle body and rotatable in a vertical direction, further including: an engine; a variable displacement traveling hydraulic pump driven by the engine; a variable displacement traveling hydraulic motor that communicates with the traveling hydraulic pump in a closed circuit manner, and transmits a drive force of the engine to wheels; a traveling state sensor that detects a traveling state of the vehicle body; an operation amount sensor that detects a lifting operation amount of the lift arm; and a controller that controls the traveling hydraulic pump and the traveling hydraulic motor, wherein the controller determines whether a specific condition for specifying an operation of the lift arm in an upper direction during forward travel of the vehicle body is satisfied or not, based on the traveling state detected by the traveling state sensor, and on the lifting operation amount of the lift arm detected by the operation amount sensor, and controls a displacement volume of the traveling hydraulic pump or a displacement volume of the traveling hydraulic motor to limit a vehicle speed in response to increase in the lifting operation amount of the lift arm, in a case of the specific condition being satisfied.

Advantageous Effects of Invention

The present invention can suppress abrupt change in vehicle speed accompanied by erroneous determination on the lift arm lifting operation. Problems, configurations and advantageous effects other than those described above are clarified by the following description of embodiments.

DESCRIPTION OF EMBODIMENTS

The entire configuration and operations of a wheel loader according to each embodiment of the present invention are described with reference to FIGS. 1 to 3.

Figure 1:
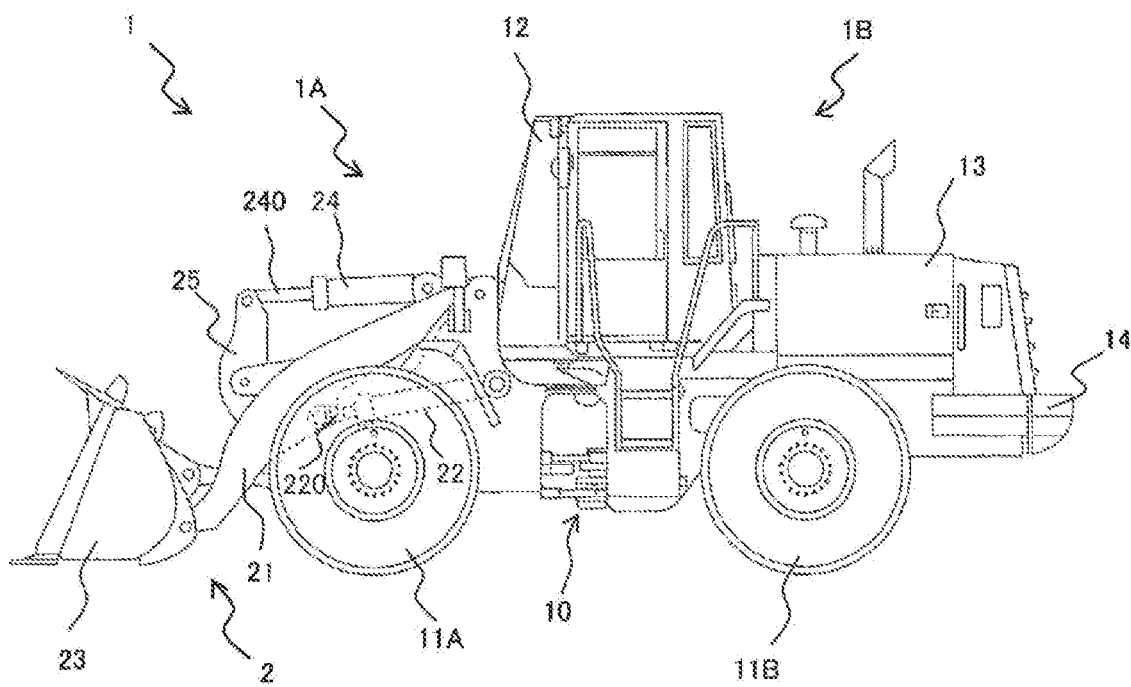
FIG. 1 is a side view showing an appearance of a wheel loader according to each embodiment of the present invention.

FIG. 1 is a side view showing an appearance of the wheel loader 1 according to each embodiment of the present invention.

The wheel loader 1 includes: a vehicle body that includes a front frame 1A and a rear frame 1B; and a front working device 2 provided at the front of the vehicle body. The wheel loader 1 is an articulate working device that is steered by bending the vehicle body around the center. The front frame 1A and the rear frame 1B are joined by a center joint 10 so as to be freely rotatable in the lateral direction. The front frame 1A is bent in the lateral direction with respect to the rear frame 1B.

The front frame 1A is provided with a pair of left and right front wheels 11A, and the front working device 2. The rear frame 1B is provided with a pair of left and right rear wheels 11B, an operating room 12 where an operator boards, a machine room 13 that accommodates various devices, such as an engine, a controller and a cooler, and a counter weight 14 for keeping the balance so as to prevent the vehicle body from inclining or rolling over. Note that FIG. 1 shows only the left front wheel 11A and rear wheel 11B among the pairs of left and right front wheels 11A and rear wheels 11B.

The front working device 2 includes: a lift arm 21 rotatable in the vertical direction; a pair of lift arm cylinders 22 that are extended and retracted to thereby drive the lift arm 21; a bucket 23 attached to the distal end of the lift arm 21; a bucket cylinder 24 that is extended and retracted to thereby rotate the bucket 23 in the vertical direction with respect to the lift arm 21; a bellcrank 25 rotatably joined to the lift arm 21 to constitute a link mechanism between the bucket 23 and the bucket cylinder 24; and a plurality of pipes (not shown) that guide pressurized oil to the pair of lift arm cylinders 22 and the bucket cylinder 24. Note that FIG. 1 shows, with broken lines, only the lift arm cylinder 22 arranged to the left between the pair of the lift arm cylinders 22.

The lift arm 21 is rotated in the upper direction by extending rods 220 of the respective lift arm cylinders 22, and is rotated in the lower direction by retracting the rods 220. The bucket 23 is rotated (tilted) in the upper direction with respect to the lift arm 21 by extending a rod 240 of the bucket cylinder 24, and is rotated (dumped) in the lower direction with respect to the lift arm 21 by retracting the rod 240.

The wheel loader 1 is a working machine for performing a loading operation that excavates earth, sand, minerals and the like in an opencast mine, for example, and loads them into a dump truck or the like. Next, V-shaped loading that is one of methods during the wheel loader 1 performing a digging operation and a loading operation, is described with reference to FIGS. 2 and 3.

Figure 2:
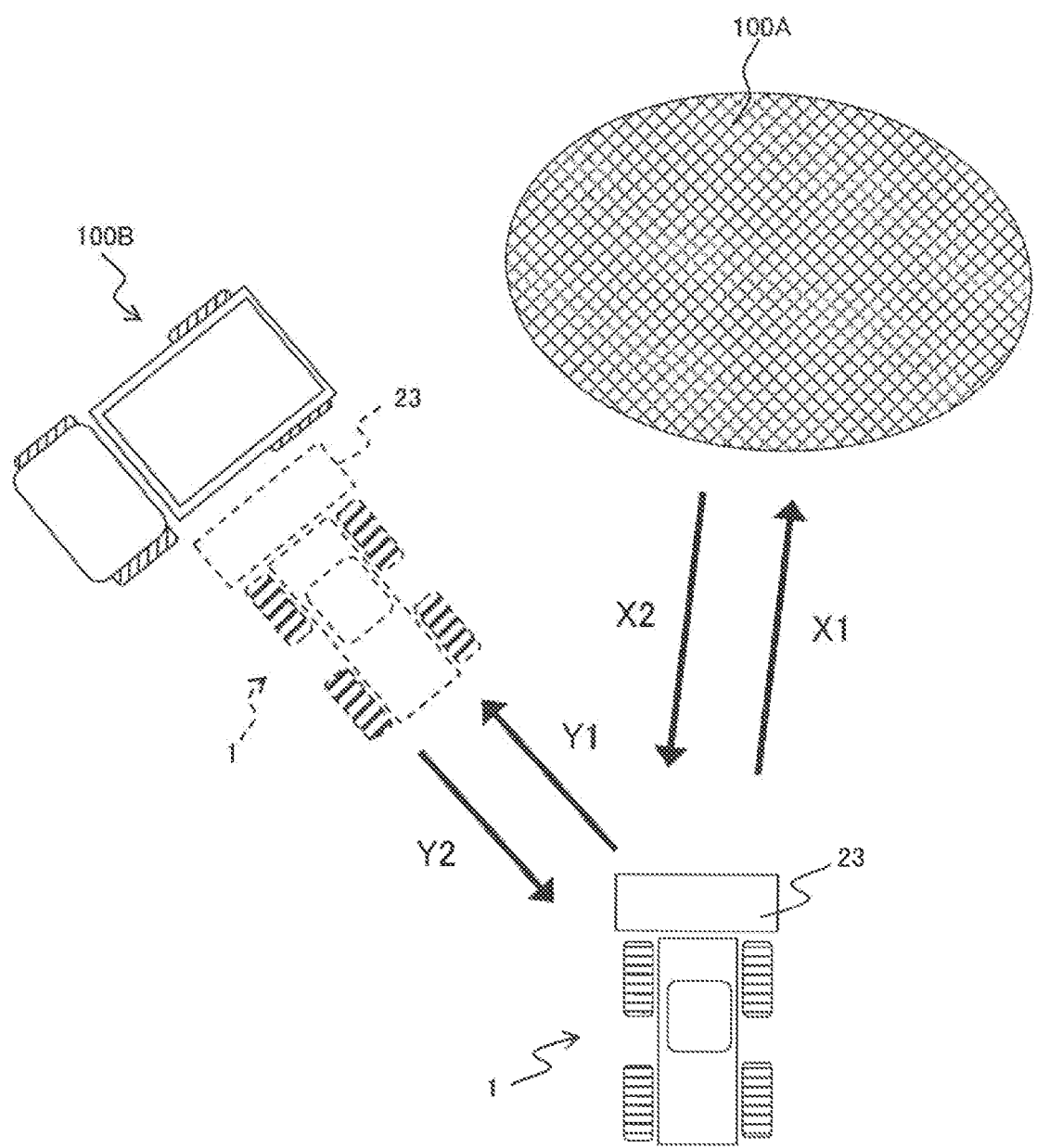
FIG. 2 illustrates V-shaped loading by the wheel loader.
Figure 3:
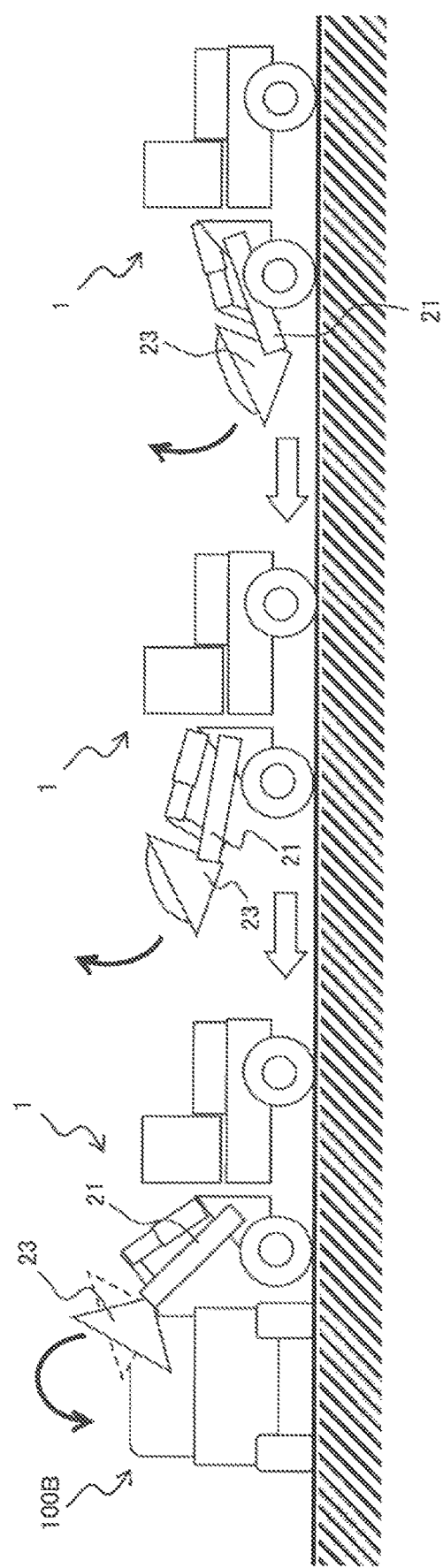
FIG. 3 illustrates a raise and run operation of the wheel loader.

FIG. 2 illustrates the V-shaped loading by the wheel loader 1. FIG. 3 illustrates a raise and run operation of the wheel loader 1.

First, as indicated by an arrow X1, the wheel loader 1 advances toward a ground 100A that is to be dug, and digs the bucket 23 into the ground 100A and performs the digging operation. After completion of the digging operation, the wheel loader 1 once goes back to the original position as indicated by an arrow X2.

Next, as indicated by an arrow Y1, the wheel loader 1 advances toward a dump truck 100B, and stops in front of the dump truck 100B. In FIG. 2, the wheel loader 1 in the state of stopping in front of the dump truck 100B is indicated by broken lines. Specifically, as shown in FIG. 3, the operator presses the accelerator pedal to the floor (fully accelerating), while performing a lifting operation for the lift arm 21 (a state shown at the right in FIG. 3). Next, with the fully accelerating state being kept, the lift arm 21 is further lifted in the upper direction (a state shown at the middle in FIG. 3). The operator then brakes to stop in front of the dump truck 100B, and dumps a load (earth, sand, minerals and the like) from the bucket 23 to load it into the dump truck 100B. Note that this series of operations is called a "raise and run operation."

After completion of the loading operation, the wheel loader 1 goes back to the original position as indicated by an arrow Y2 in FIG. 2. As described above, the wheel loader 1 travels to and fro between the ground 100A and the dump truck 100B in a V-shaped manner to perform the digging operation and the loading operation.

Next, a drive system of the wheel loader 1 is described with respect to each embodiment.

First Embodiment

The drive system of a wheel loader 1 according to a first embodiment of the present invention is described with reference to FIGS. 4 to 16.

(Travel Drive System)

First, the travel drive system of the wheel loader 1 is described with reference to FIGS. 4 to 7.

Figure 4:
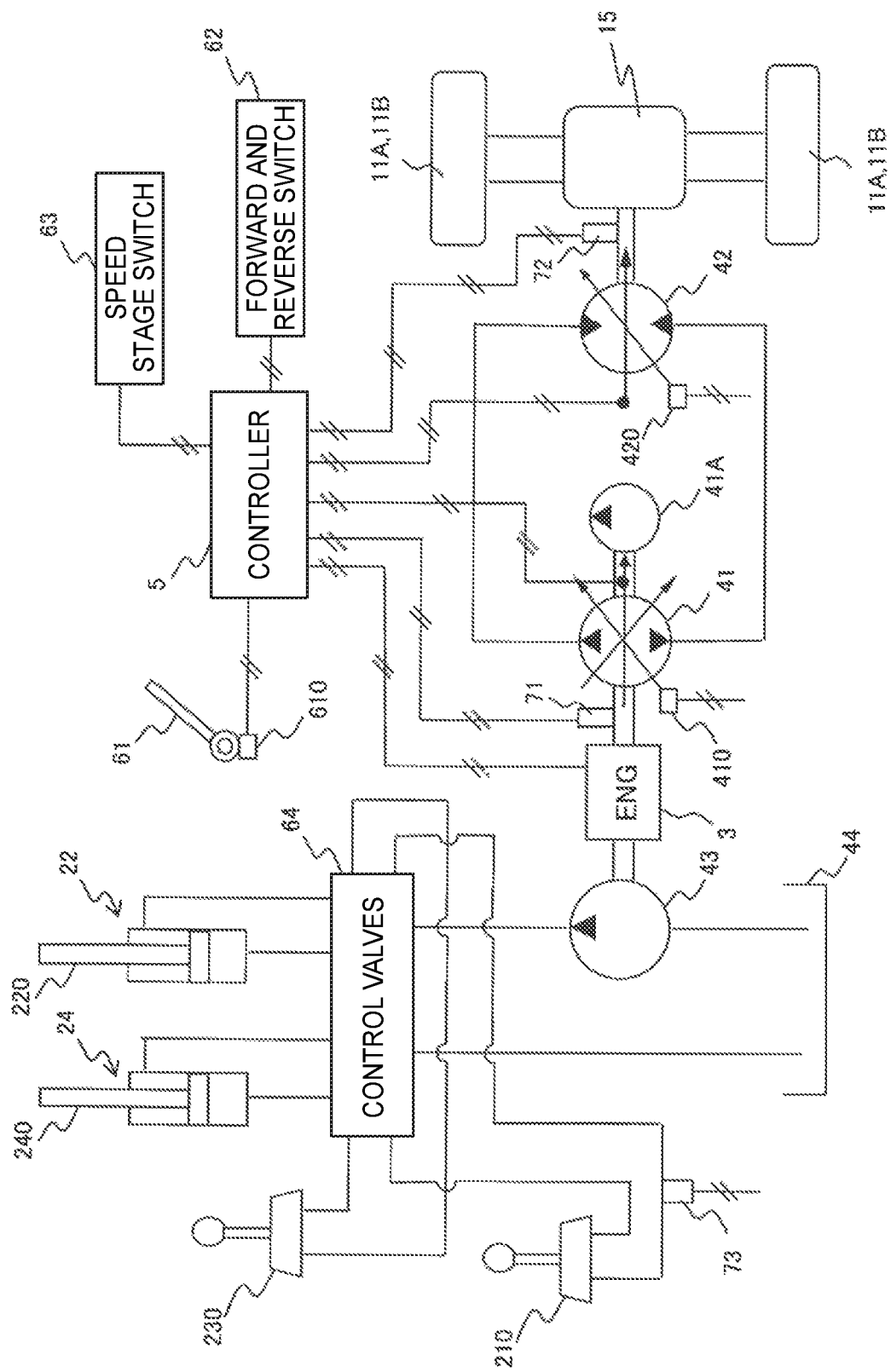
FIG. 4 shows a hydraulic circuit and an electric circuit of the wheel loader according to a first embodiment.
Figure 5:
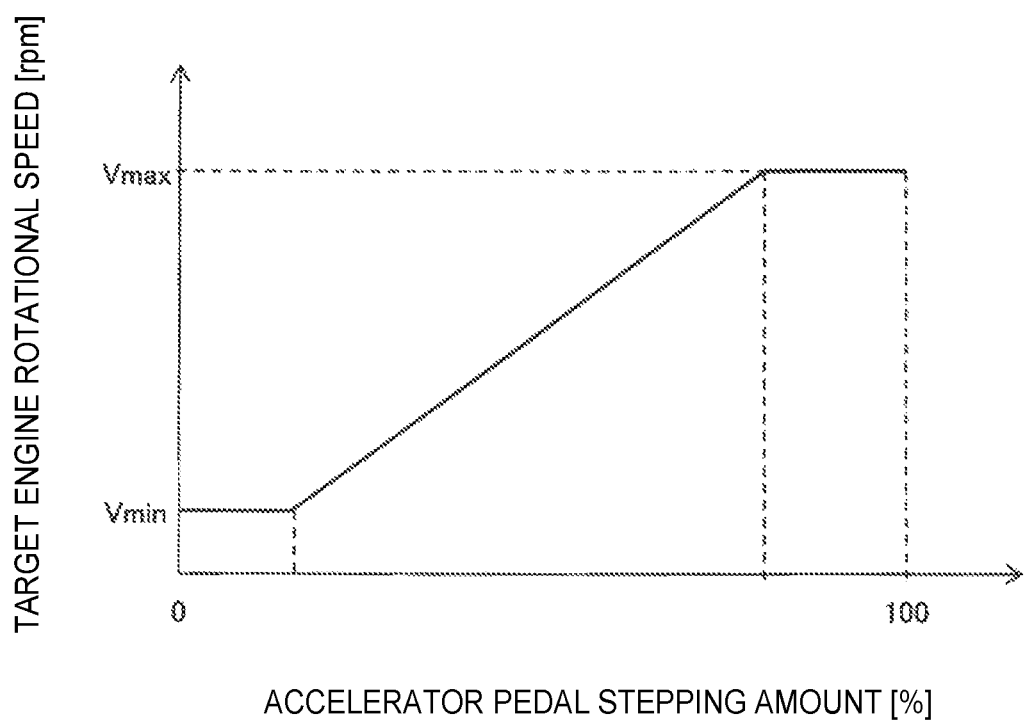
FIG. 5 is a graph showing the relationship between an accelerator pedal stepping amount and a target engine rotational speed.
Figure 6A:
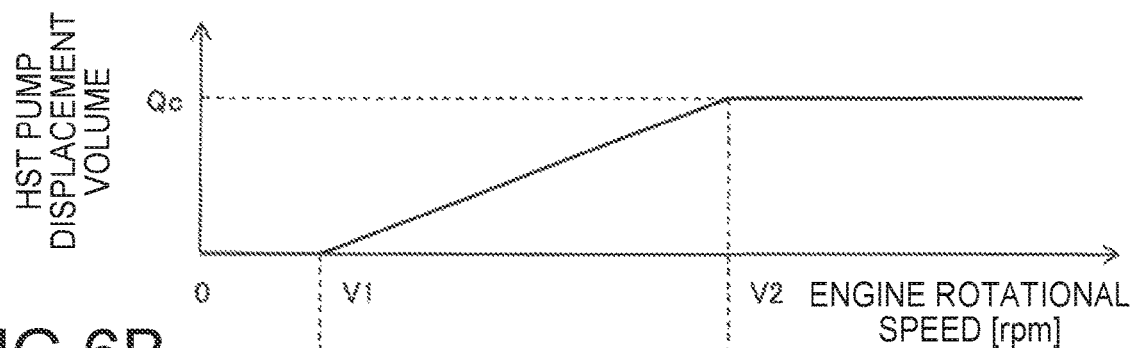
FIG. 6A is a graph showing the relationship between the number of engine revolutions and the displacement volume of an HST pump.
Figure 6B:
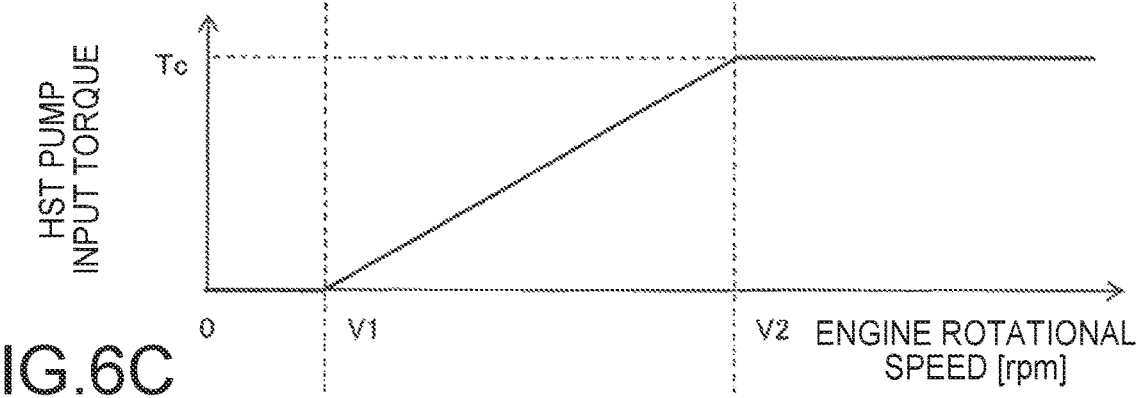
FIG. 6B is a graph showing the relationship between the number of engine revolutions and input torque to the HST pump.
Figure 6C:
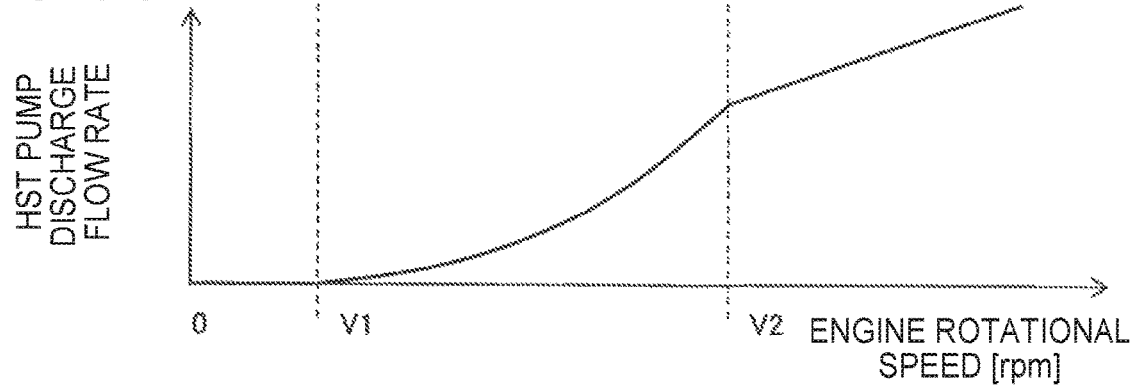
FIG. 6C is a graph showing the relationship between the number of engine revolutions and the discharge flow rate of the HST pump.
Figure 7:
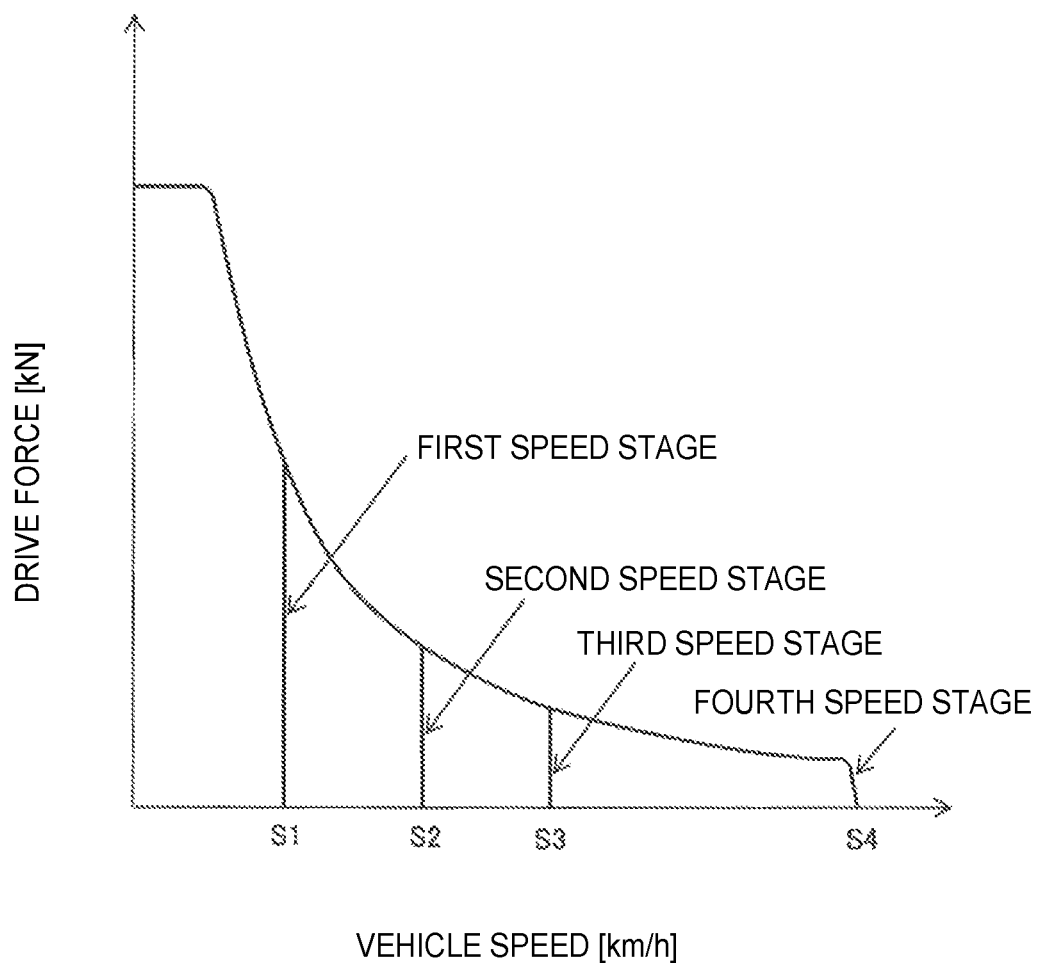
FIG. 7 is a graph showing the relationship between the vehicle speed and the drive force for each speed stage.

FIG. 4 shows a hydraulic circuit and an electric circuit of the wheel loader 1 according to this embodiment. FIG. 5 is a graph showing the relationship between an accelerator pedal stepping amount and a target engine rotational speed. FIG. 6(a) is a graph showing the relationship between the number of revolutions of an engine 3 and the displacement volume of an HST pump 41, FIG. 6(b) is a graph showing the relationship between the number of revolutions of the engine 3 and input torque to the HST pump 41, and FIG. 6(c) is a graph showing the relationship between the number of revolutions of the engine 3 and the discharge flow rate of the HST pump 41. FIG. 7 is a graph showing the relationship between the vehicle speed and the drive force for each speed stage.

Traveling of the vehicle body of the wheel loader 1 according to this embodiment is controlled by an HST travel drive system. As shown in FIG. 4, the wheel loader 1 includes: the engine 3; the HST pump 41 that is a variable displacement traveling hydraulic pump driven by the engine 3; an HST charge pump 41A that supplies pressurized oil for controlling the HST pump 41; an HST motor 42 that is a traveling hydraulic motor communicating with the HST pump 41 in a closed circuit manner; and a controller 5 that controls the HST pump 41 and the HST motor 42.

The HST pump 41 is a swash-plate or bent-axis type hydraulic pump whose displacement volume is controlled in response to a tilt angle. The tilt angle is adjusted by a pump regulator 410 according to a command signal output from the controller 5.

The HST motor 42 is a swash-plate or bent-axis type hydraulic motor whose displacement volume is controlled in response to the tilt angle. Similar to the HST pump 41, the tilt angle is adjusted by a motor regulator 420 according to a command signal output from the controller 5.

As for the HST travel drive system, first, the operator presses an accelerator pedal 61 provided in the operating room 12 to rotate the engine 3, and the HST pump 41 is driven by the drive force of the engine 3. The HST motor 42 is then rotated by pressurized oil discharged from the HST pump 41. The output torque from the HST motor 42 is transmitted to the front wheels 11A and the rear wheels 11B via an axle 15, thereby causing the wheel loader 1 to travel.

Specifically, as shown in FIG. 4, the stepping amount on the accelerator pedal 61 detected by a stepping amount sensor 610 is input into the controller 5. A target engine rotational speed is output as the command signal from the controller 5 to the engine 3. The number of revolutions of the engine 3 is controlled in conformity with the target engine rotational speed. As shown in FIG. 4, the rotational speed of the engine 3 is detected by an engine rotational speed sensor 71 provided at an output shaft of the engine 3.

As shown in FIG. 5, the stepping amount on the accelerator pedal 61 and the target engine rotational speed have a proportional relationship. The more the stepping amount on the accelerator pedal 61 is, the higher the target engine rotational speed is.

Note that in FIG. 5, in a range of the stepping amount on the accelerator pedal 61 from 0% to 20% or 30%, the target engine rotational speed is constant at the minimum target engine rotational speed Vmin irrespective of the stepping amount on the accelerator pedal 61. In a range of the stepping amount on the accelerator pedal 61 from 70% or 80% to 100%, the target engine rotational speed is constant at the maximum target engine rotational speed Vmax irrespective of the stepping amount on the accelerator pedal 61.

As described above, with respect to the relationship between the stepping amount on the accelerator pedal 61 and the target engine rotational speed, setting is configured so as to maintain the target engine rotational speed at the minimum target engine rotational speed Vmin in a predetermined range with a small stepping amount on the accelerator pedal 61, and to maintain the target engine rotational speed at the maximum target engine rotational speed Vmax in a predetermined range with a large stepping amount on the accelerator pedal 61. Note that such setting can be freely changed.

Next, the relationship between the engine 3 and the HST pump 41 are as shown in FIGS. 6(a) to 6(c).

As shown in FIG. 6(a), at the engine rotational speed from V1 to V2, the rotational speed of the engine 3 and the displacement volume of the HST pump 41 have a proportional relationship. As the rotational speed of the engine 3 increases from V1 to V2 (V1<V2), the displacement volume increases from zero to a predetermined value Qc. When the engine rotational speed is equal to or higher than V2, the displacement volume of the HST pump 41 becomes constant at the predetermined value Qc irrespective of the engine rotational speed.

The input torque of the HST pump 41 is a product of the displacement volume and the discharge pressure (input torque=displacement volume×discharge pressure). As shown in FIG. 6(b), at the engine rotational speed from V1 to V2, the rotational speed of the engine 3 and the input torque of the HST pump 41 have a proportional relationship. As the rotational speed of the engine 3 increases from V1 to V2, the input torque increases from zero to a predetermined value Tc. When the engine rotational speed is equal to or higher than V2, the input torque of the HST pump 41 becomes constant at the predetermined value Tc irrespective of the engine rotational speed.

As shown in FIG. 6(c), at the engine rotational speed from V1 to V2, the discharge flow rate of the HST pump 41 is proportional to the square of the rotational speed of the engine 3. When the engine rotational speed is equal to or higher than V2, the rotational speed of the engine 3 and the discharge flow rate of the HST pump 41 have a linear proportional relationship. As the rotational speed of the engine 3 increases, the discharge flow rate increases.

Accordingly, as the rotational speed of the engine 3 increases, the discharge flow rate of the HST pump 41 increases, and the flow rate of the pressurized oil flowing from the HST pump 41 to the HST motor 42 increases. Consequently, the number of revolutions of the HST motor 42 increases, which in turn increases the vehicle speed. The vehicle speed is detected as the rotational speed of the HST motor 42 by a motor rotational speed sensor 72 (see FIG. 4).

As described above, the HST travel drive system adjusts (changes) the vehicle speed by continuously increasing and reducing the discharge flow rate of the HST pump 41. Accordingly, the wheel loader 1 can smoothly start and stop with a small shock. Note that it is not required to control the vehicle speed by adjusting the discharge flow rate by the HST pump 41. Alternatively, the vehicle speed may be controlled by adjusting the displacement volume by the HST motor 42.

In this embodiment, as shown in FIG. 4, a speed stage switch 63 for selecting the maximum vehicle speed from among first to fourth stages is provided. The speed stage switch 63 is mainly used for advance travel of the wheel loader 1. As shown in FIG. 7, the maximum vehicle speed is set to S1 at the first speed stage, the maximum vehicle speed is set to S2 at the second speed stage, the maximum vehicle speed is set to S3 at the third speed stage, and the maximum vehicle speed is set to S4 at the fourth speed stage. Note that the magnitude relationship among S1, S2, S3 and S4 is S1<S2<S3<S4. FIG. 7 shows the relationship between the maximum vehicle speed and the drive force at each speed stage.

Among the first to fourth speed stages, the first speed stage and the second speed stage correspond to "low speed stage" and the third speed stage and the fourth speed stage correspond to "medium to high speed stages." The "low speed stage" is selected when the wheel loader 1 travels toward the dump truck 100B in the loading operation (in the case of indication by the arrow Y1 in FIG. 2), that is, at the time of raise and run operation, and the maximum vehicle speed is set to range from 9 to 15 km/hour, for example.

Selection of the traveling direction of the wheel loader 1, that is, selection between the forward travel and reverse travel is performed by a forward and reverse switch 62 provided in the operating room 12 (see FIG. 4). Specifically, when the operator selects the advance position by the forward and reverse switch 62, a forward and reverse switching signal indicating the forward travel is output to the controller 5, and the controller 5 outputs, to the transmission, a command signal for bringing a forward clutch of the transmission into an engaged state. When the transmission receives the command signal pertaining to the advance travel, the forward clutch comes into the engaged state, and the traveling direction of the vehicle body is switched to advance travel. Reverse travel of the vehicle body is selected also by a similar mechanism.

(Drive System of Front Working Device 2)

Next, the drive system of the front working device 2 is described with reference to FIGS. 4 and 8 to 11.

Figure 8:
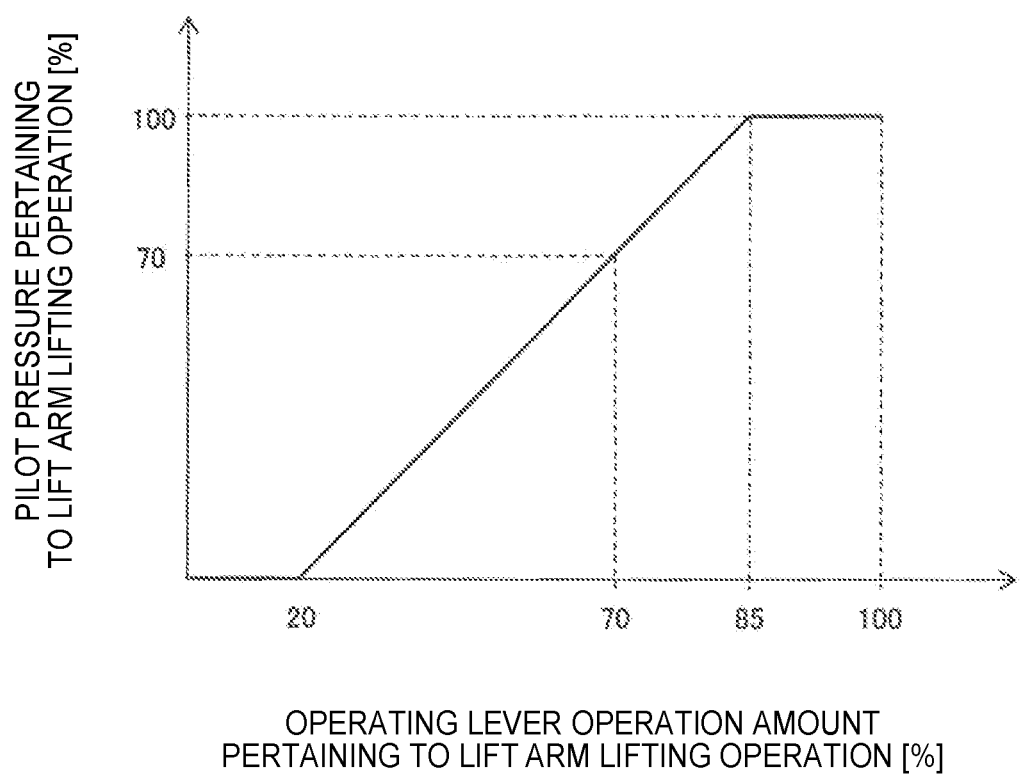
FIG. 8 is a graph showing the relationship between a lift arm lifting operation amount and a pilot pressure.
Figure 9:
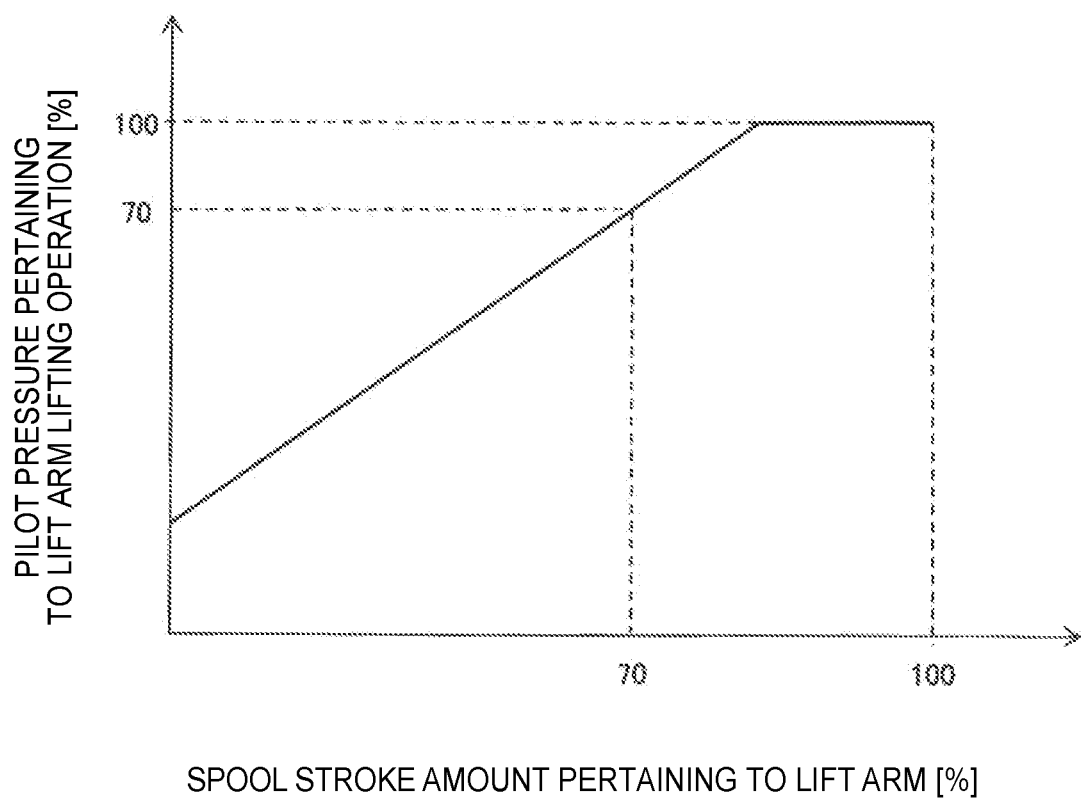
FIG. 9 is a graph showing the relationship between the spool stroke amount and the pilot pressure.
Figure 10:
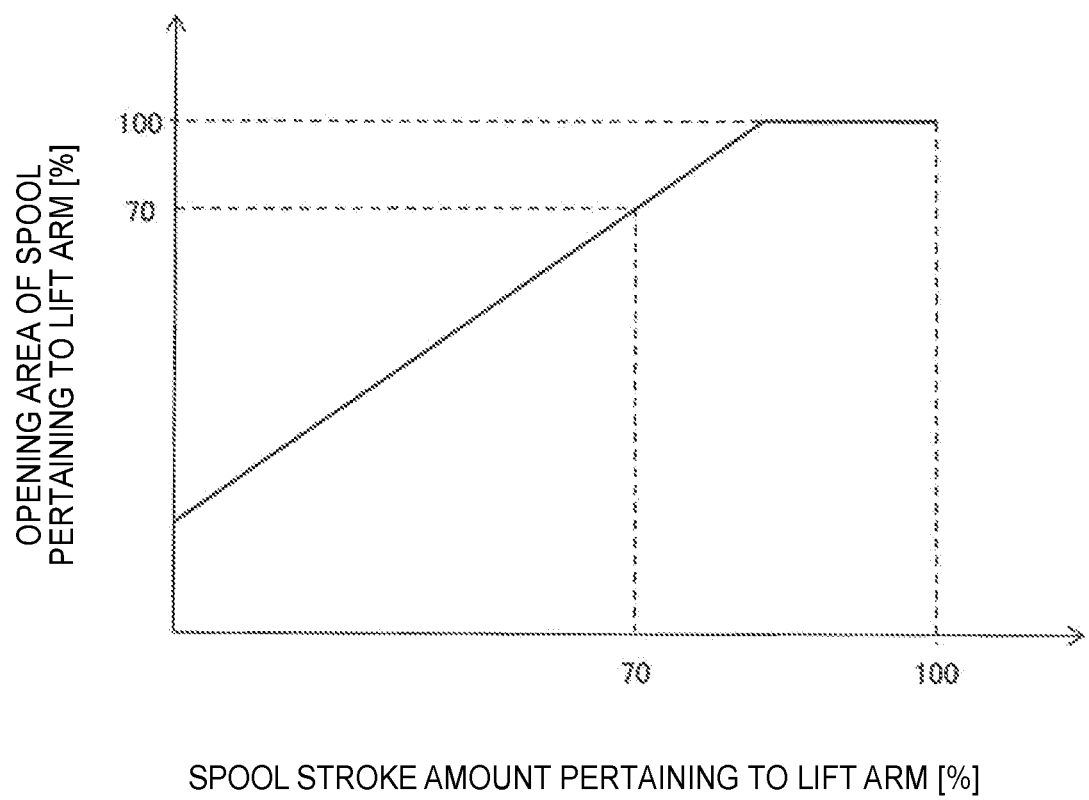
FIG. 10 is a graph showing the relationship between the spool stroke amount and the opening area of the spool.
Figure 11:
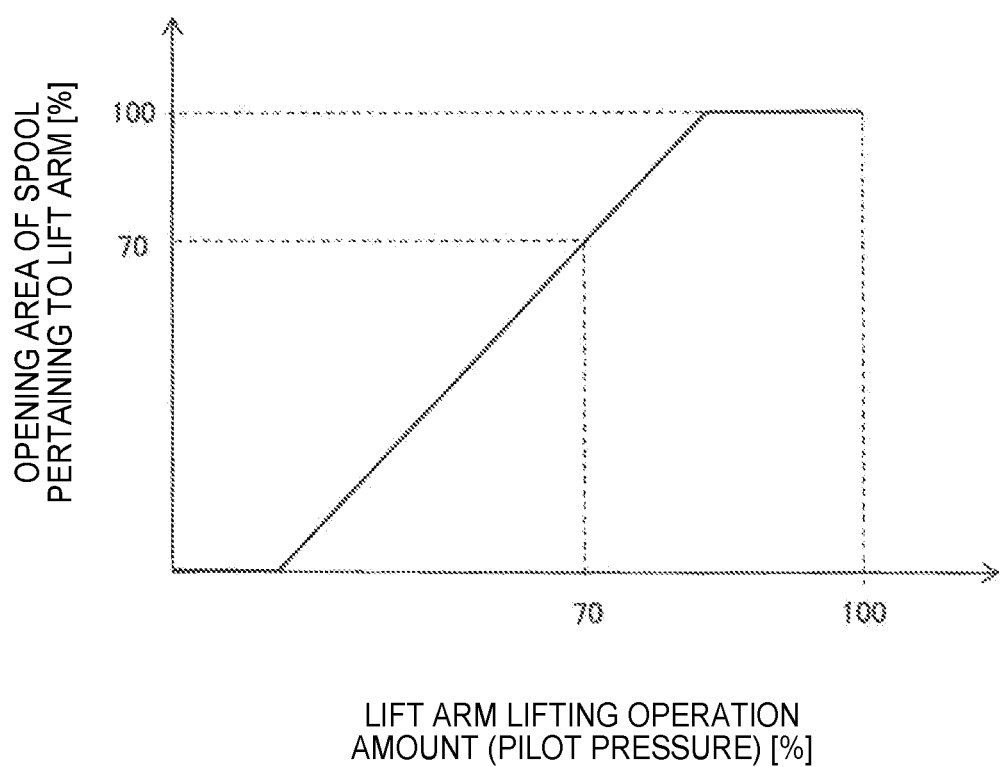
FIG. 11 is a graph showing the relationship between the lift arm lifting operation amount and the opening area of the spool.

FIG. 8 is a graph showing the relationship between the lifting operation amount for the lift arm 21 and a pilot pressure. FIG. 9 is a graph showing the relationship between the spool stroke amount and the pilot pressure. FIG. 10 is a graph showing the relationship between the spool stroke amount and the opening area of the spool. FIG. 11 is a graph showing the relationship between the lifting operation amount for the lift arm 21 and the opening area of the spool.

As shown in FIG. 4, the wheel loader 1 is driven by the engine 3, and includes: a working device hydraulic pump 43 that supplies the front working device 2 with hydraulic oil; a hydraulic oil tank 44 that stores the hydraulic oil; a lift arm operating lever 210 for operating the lift arm 21; a bucket operating lever 230 for operating the bucket 23; and control valves 64 that control the flow of pressurized oil supplied from the working device hydraulic pump 43 to the lift arm cylinders 22 and the bucket cylinder 24.

As the working device hydraulic pump 43, a fixed hydraulic pump is adopted in this embodiment. The discharge pressure from the working device hydraulic pump 43 is detected by the pressure sensor (not shown), and a signal pertaining to the detected discharge pressure is output to the controller 5.

When the operator operates the lift arm operating lever 210 in the direction of lifting the lift arm 21, the pilot pressure in proportion to the operation amount is generated, as shown in FIG. 8. Note that in FIG. 8, in the range of the lifting operation amount for the lift arm 21 from 0% to 20%, the pilot pressure is not generated, and is constant at 0% (dead zone). In the range of the lifting operation amount for the lift arm 21 from 85% to 100%, the pilot pressure is constant at 100% irrespective of the lifting operation amount for the lift arm 21, and the state is maintained to be a full lever operation state. These ranges can be freely changed and configured.

The lifting operation amount for the lift arm 21 (the operation amount for the lift arm operating lever 210 pertaining to the lifting operation for the lift arm 21) is detected by the operation amount sensor 73. In this embodiment, based on the proportional relationship between the lifting operation amount for the lift arm 21 and the pilot pressure as shown in FIG. 8, the operation amount sensor 73 detects the pilot pressure as the lifting operation amount for the lift arm 21.

The pilot pressure generated in response to the lifting operation for the lift arm 21 by the lift arm operating lever 210 acts on the control valves 64, and the spool in the control valve 64 moves in a stroke in proportion to the pilot pressure.

Note that as shown in FIG. 9, the spool in the control valve 64 is configured so as not to move in the stroke even when the pilot pressure about 20% to 30% acts on the control valve 64. In a range of the spool stroke amount from 80% to 100%, the pilot pressure acting on the control valve 64 is configured to be constant at 100%. These ranges can also be freely changed and configured.

As shown in FIG. 10, when the spool moves in the stroke in the control valve 64, a pipe line allowing the working device hydraulic pump 43 and the lift arm cylinders 22 to communicate with each other is opened with an opening area in proportion to the amount of movement in the stroke. Also as for the relationship between the spool stroke amount and the spool opening area, a dead zone is provided for a predetermined range having a small spool stroke amount. In a predetermined range having a large spool stroke amount, a fully moved state in the stroke is maintained.

By opening the pipe line allowing the working device hydraulic pump 43 and the lift arm cylinders 22 to communicate with each other, the hydraulic oil discharged from the working device hydraulic pump 43 flows into the lift arm cylinders 22 through the control valve 64, thereby extending the rods 220 of the lift arm cylinders 22.

Consequently, as shown in FIG. 11, the lifting operation amount for the lift arm 21 and the spool opening area of the control valve 64 have a proportional relationship. As the lifting operation amount for the lift arm 21 increases, the spool opening area increases accordingly. Consequently, when the lift arm operating lever 210 is operated largely in the direction of lifting the lift arm 21, the hydraulic oil flow rate into the lift arm cylinders 22 increases to extend rapidly the rods 220 accordingly.

Also as for the relationship between the lifting operation amount for the lift arm 21 and the spool opening area of the control valve 64, a dead zone is provided for a predetermined range with a small lifting operation amount for the lift arm 21. In a predetermined range with a large lifting operation amount for the lift arm 21, a fully operated state is maintained.

Also as for the operation of the bucket 23, similar to the operation of the lift arm 21, the pilot pressure generated in response to the operation amount for the bucket operating lever 230 acts on the control valve 64, which controls the spool opening area of the control valve 64, and adjusts the hydraulic oil flow rate into and from the bucket cylinder 24.

Although illustration is omitted in FIG. 4, operation amount (pilot pressure) sensors for detecting the lowering operation amount for the lift arm 21, and tilt and dump operation amounts for the bucket 23 are provided on the respective pipe lines of the hydraulic circuit.

(Configuration and Functions of Controller 5)

Next, the configuration and functions of the controller 5 are described with reference to FIGS. 12 to 16.

Figure 12:
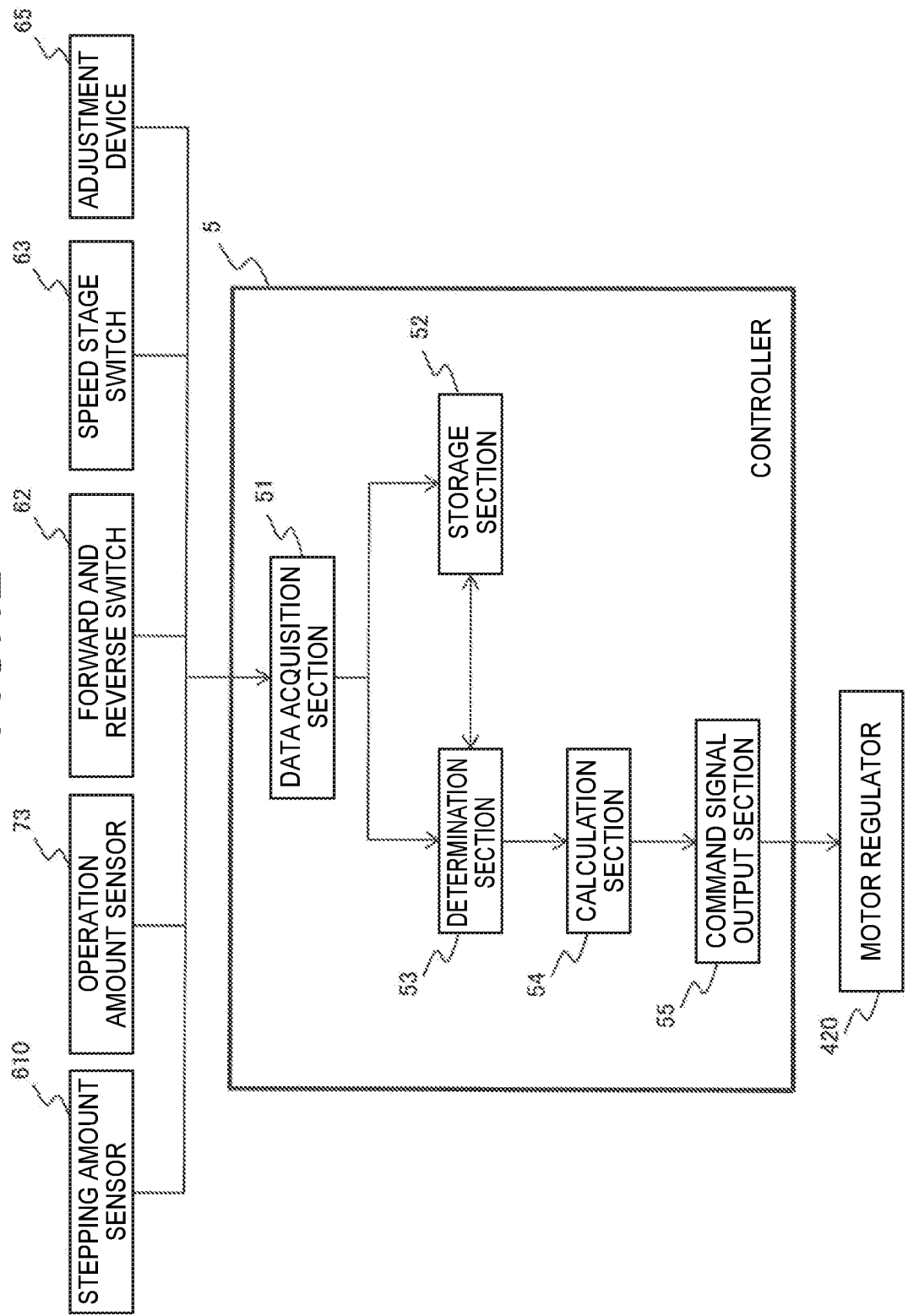
FIG. 12 is a functional block diagram showing functions that a controller has.
Figure 13:
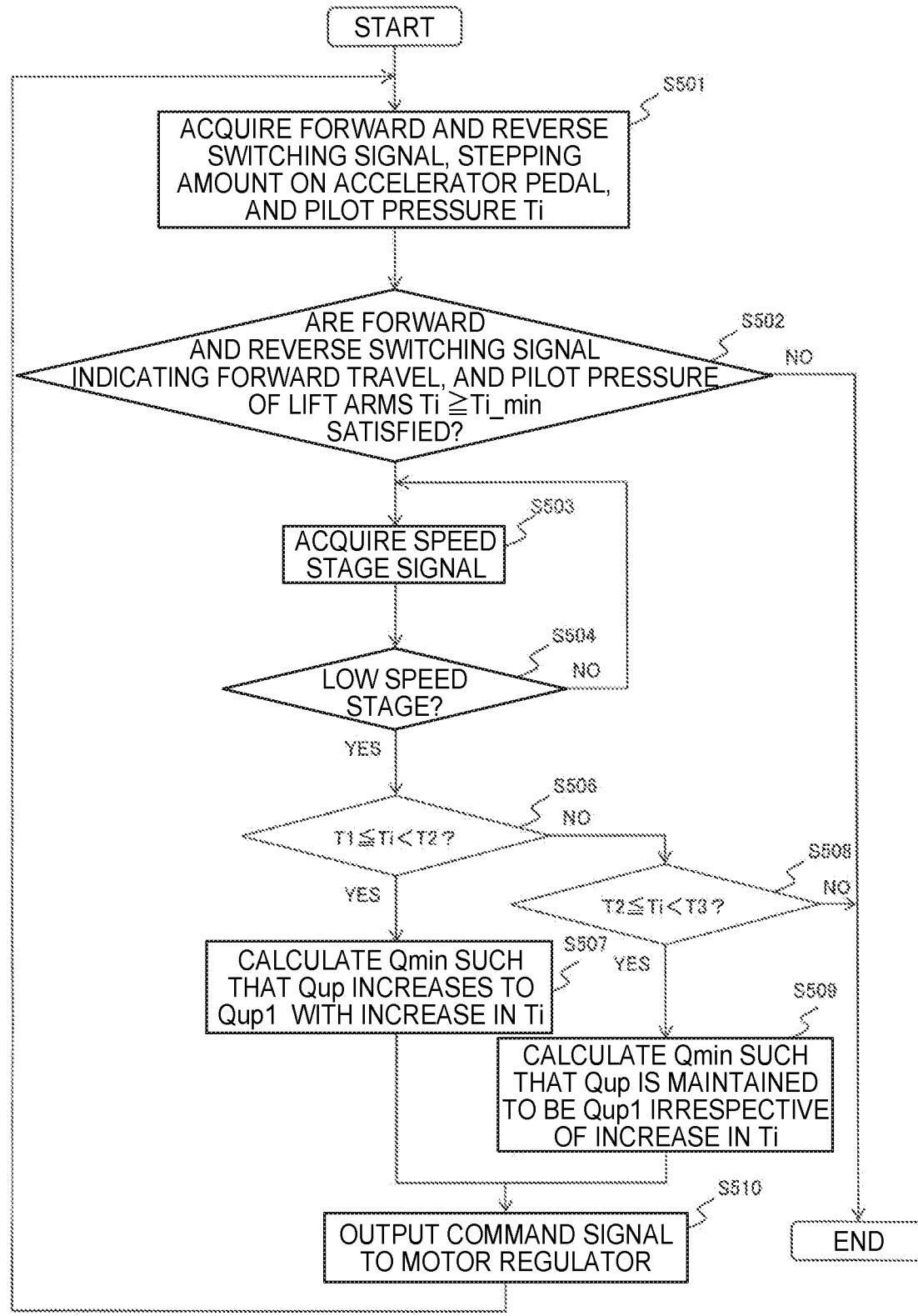
FIG. 13 is a flowchart showing the flow of processes executed by the controller.
Figure 14:
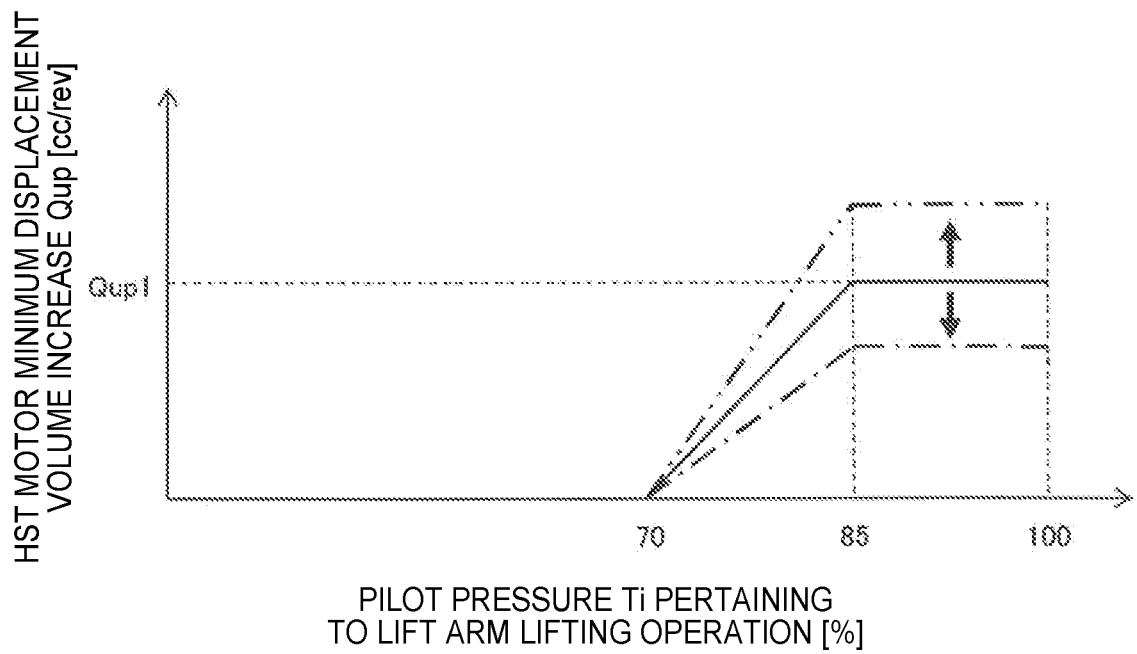
FIG. 14 is a graph showing the relationship between the pilot pressure pertaining to the lift arm lifting operation, and the increase in the minimum displacement volume of an HST motor.
Figure 15:
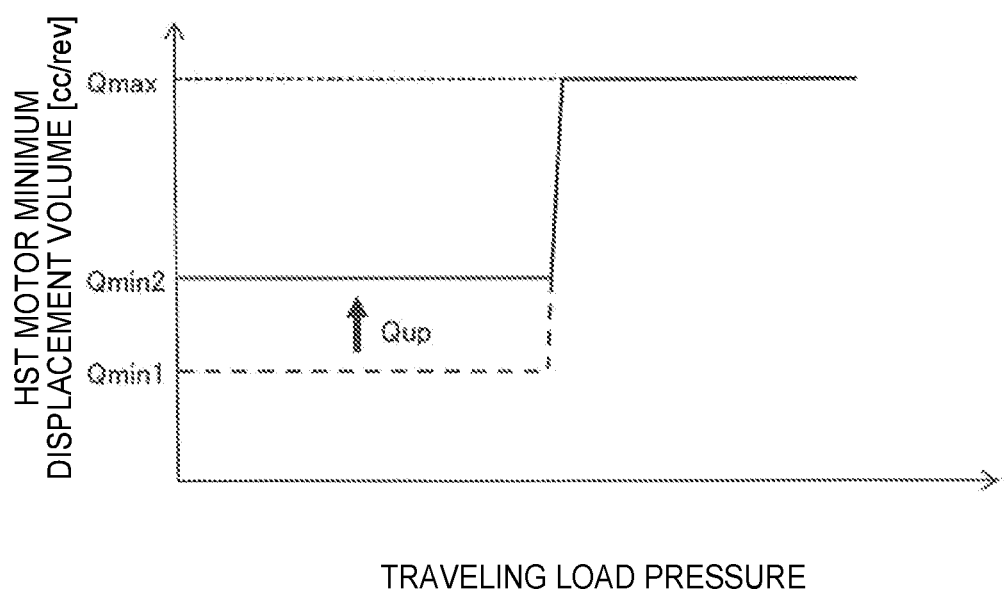
FIG. 15 is a graph showing the relationship between a traveling load pressure and the minimum displacement volume of the HST motor.
Figure 16:
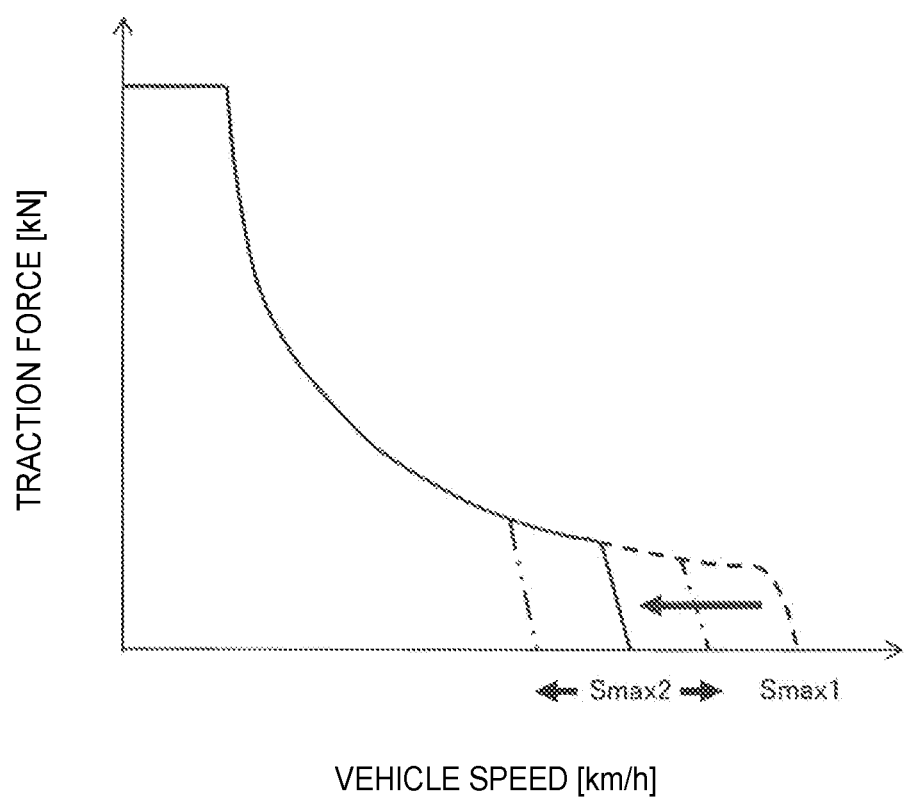
FIG. 16 is a graph showing the relationship between the vehicle speed and the traction force of the wheel loader.

FIG. 12 is a functional block diagram showing functions that the controller 5 has. FIG. 13 is a flowchart showing the flow of processes executed by the controller 5. FIG. 14 is a graph showing the relationship between the pilot pressure Ti pertaining to the lift arm lifting operation, and the increase Qup in the minimum displacement volume of the HST motor 42. FIG. 15 is a graph showing the relationship between a traveling load pressure and the minimum displacement volume Qmin of the HST motor 42. FIG. 16 is a graph showing the relationship between the vehicle speed and the traction force of the wheel loader 1.

The controller 5 is configured such that a CPU, a RAM, a ROM, an HDD, an input I/F, and an output I/F are connected to each other via a bus. The various operation devices, such as the forward and reverse switch 62 and the speed stage switch 63, the various sensors, such as the stepping amount sensor 610 and the operation amount sensor 73 (see FIG. 4), and the like are connected to the input I/F. The pump regulator 410 of the HST pump 41, the motor regulator 420 of the HST motor 42 and the like are connected to the output I/F.

In such a hardware configuration, the CPU reads an operation program (software) stored in a recording medium, such as the ROM, the HDD or an optical disk, deploys the program on the RAM, and executes the deployed operation program, which allows the operation program and the hardware to cooperate with each other, and achieves the functions of the controller 5.

In this embodiment, the configuration of the controller 5 is described with reference to the combination of the software and the hardware. Without limitation thereto, the configuration may be achieved using an integrated circuit that achieves the functions of the operation program to be executed on the wheel loader 1.

As shown in FIG. 12, the controller 5 includes a data acquisition section 51, a storage section 52, a determination section 53, a calculation section 54, and a command signal output section 55.

The data acquisition section 51 acquires data items pertaining to the forward and reverse switching signal that has been output from the forward and reverse switch 62 and indicates forward or reverse travel, the stepping amount on the accelerator pedal 61 detected by the stepping amount sensor 610, the pilot pressure Ti as the lifting operation amount for the lift arm 21 detected by the operation amount sensor 73 (hereinafter, simply called "pilot pressure Ti"), and a speed stage signal output from the speed stage switch 63.

The storage section 52 stores a first pilot threshold T1, a second pilot threshold T2 and a third pilot threshold T3 that pertain to the pilot pressure for the lifting operation for the lift arm 21. The first pilot threshold T1 and the second pilot threshold T2 are pilot pressures in a state where the lift arm 21 is lifted in the upper direction higher than the lift arm 21 in a horizontal attitude. The second pilot threshold T2 is configured to have a larger value than the first pilot threshold T1 has (T1<T2). For example, in this embodiment, the first pilot threshold T1 is 70% (T1=70%), and the second pilot threshold T2 is 85% (T2=85%). Note that the first pilot threshold T1 may be a pilot pressure at least when the lift arm 21 is in the horizontal attitude in situations where the lift arm 21 is performing the lifting operation. The third pilot threshold T3 is a pilot pressure with the lift arm 21 having been completely lifted in the upper direction, that is, 100% (T3=100%).

The determination section 53 determines whether the wheel loader 1 is traveling forward or not on the basis of the forward and reverse switching signal acquired by the data acquisition section 51 and of the stepping amount on the accelerator pedal 61, and determines whether the lift arm 21 is in the lifting operation or not on the basis of the pilot pressure Ti acquired by the data acquisition section 51, for example, of whether the pilot pressure Ti of the lift arm 21 in the lifting direction is equal to or more than the minimum value Ti_min of the pilot pressure or not. Hereinafter, a condition for specifying the operation of the lift arm 21 in the upper direction during forward travel of the wheel loader 1 is regarded as a "specific condition." A case of satisfying the "specific condition" is a case of performing the raise and run operation described above.

Here, each of the forward and reverse switch 62 and the stepping amount sensor 610 is a mode of detecting a traveling state sensor that detects the traveling state of the vehicle body of the wheel loader 1. Note that in this embodiment, advance travel of the vehicle body is determined on the basis of the forward and reverse switching signal that indicates forward travel and has been output from the forward and reverse switch 62 and of the stepping amount on the accelerator pedal 61 detected by the stepping amount sensor 610. Without limitation thereto, the forward travel of the vehicle body may be integrally determined in consideration of traveling states detected by other traveling state sensors mounted on the vehicle body.

In this embodiment, upon determination that the specific condition is satisfied (in the raise and run operation), the determination section 53 determines the magnitude relationship between the pilot pressure Ti and the first to third pilot thresholds T1, T2 and T3 on the basis of the pilot pressure Ti acquired by the data acquisition section 51 and of the first to third pilot thresholds T1, T2 and T3 read from the storage section 52. Furthermore, the determination section 53 determines whether the low speed stage is selected or not on the basis of the speed stage signal acquired by the data acquisition section 51.

When the determination section 53 determines that the specific condition is satisfied (in the raise and run operation), the calculation section 54 calculates the minimum displacement volume Qmin of the HST motor 42. Note that the calculation section 54 is not necessarily required to calculate the minimum displacement volume Qmin of the HST motor 42, and may calculate the maximum displacement volume Qmax of the HST pump 41 instead.

The command signal output section 55 outputs a command signal in conformity with the minimum displacement volume Qmin of the HST motor 42 calculated by the calculation section 54, to the motor regulator 420. Note that in the case where the calculation section 54 calculates the maximum displacement volume Qmax of the HST pump 41, the command signal output section 55 outputs a command signal in conformity with the maximum displacement volume Qmax of the HST pump 41, to the pump regulator 410.

Next, a flow of specific processes executed in the controller 5 is described.

As shown in FIG. 13, first, the data acquisition section 51 acquires the forward and reverse switching signal from the forward and reverse switch 62, the stepping amount on the accelerator pedal 61 from the stepping amount sensor 610, and the pilot pressure Ti from the operation amount sensor 73 (step S501).

Next, the determination section 53 determines whether the forward and reverse switching signal indicates forward travel or not (the wheel loader 1 is traveling forward or not) on the basis of the data items acquired in step S501, and determines whether the pilot pressure Ti of the lift arm 21 in the lifting direction is equal to or higher than the minimum value Ti_min of the pilot pressure or not (the lift arm 21 is performing the lifting operation or not) (step S502). That is, in step S02, it is determined whether the specific condition is satisfied or not.

If it is determined that the forward and reverse switching signal indicates forward travel and the pilot pressure Ti of the lift arm 21 in the lifting direction is equal to or higher than the minimum value Ti_min of the pilot pressure (Ti≥Ti_min) in step S502, that is, it is determined that the specific condition is satisfied (step S502/YES), the data acquisition section 51 acquires the speed stage signal from the speed stage switch 63 (step S503). On the contrary, if it is determined that the specific condition is not satisfied in step S502 (step S502/NO), the processes in the controller 5 are finished.

The determination section 53 determines whether the speed stage is the low speed stage or not on the basis of the speed stage signal acquired in step S503 (step S504). If it is determined that the speed stage is the low speed stage in step S504 (step S504/YES), the magnitude relationship between the pilot pressure Ti acquired in step S501 and the first pilot threshold T1 and second pilot threshold T2 read from the storage section 52 is determined. Specifically, the determination section 53 determines whether or not the pilot pressure Ti is equal to or higher than the first pilot threshold T1 and lower than the second pilot threshold T2 (step S506).

If it is determined that the pilot pressure Ti is equal to or higher than the first pilot threshold T1 and lower than the second pilot threshold T2 (T1≤Ti<T2) in step S506 (step S506/YES), the calculation section 54 calculates the minimum displacement volume Qmin of the HST motor 42 such that the pilot pressure Ti and the increase Qup in the minimum displacement volume of the HST motor 42 have a proportional relationship (step S507).

The command signal output section 55 then outputs a command signal in conformity with the minimum displacement volume Qmin of the HST motor 42 calculated in step S507, to the motor regulator 420 (step S510).

As shown in FIG. 14, at the pilot pressure Ti ranging from the first pilot threshold T1 (T1=70%) to the second pilot threshold T2 (T2=85%) (70% Ti<85%), the controller 5 increases the minimum displacement volume Qmin of the HST motor 42 such that as the pilot pressure Ti increases, the increase Qup in the minimum displacement volume of the HST motor 42 increases to a predetermined value Qup1 (0<Qup1), and limits the vehicle speed (decreases the speed). Accordingly, in this embodiment, only after the pilot pressure Ti reaches the first pilot threshold T1, the controller 5 executes a process for limiting the vehicle speed.

On the contrary, if it is not determined that the pilot pressure Ti is equal to or higher than the first pilot threshold T1 and is lower than the second pilot threshold T2 (T1≤Ti<T2) in step S506 (step S506/NO), the determination section 53 further determines whether or not the pilot pressure Ti is equal to or higher than the second pilot threshold T2 and lower than the third pilot threshold T3 (step S508).

If it is determined that the pilot pressure Ti is equal to or higher than the second pilot threshold T2 and lower than the third pilot threshold T3 (T2≤Ti<T3) in step S508 (step S508/YES), the calculation section 54 calculates the minimum displacement volume Qmin of the HST motor 42 so as to maintain the increase Qup in the minimum displacement volume of the HST motor 42 to be the predetermined value Qup1 irrespective of increase in pilot pressure Ti (step S509).

The command signal output section 55 then outputs a command signal in conformity with the minimum displacement volume Qmin of the HST motor 42 calculated in step S509, to the motor regulator 420 (step S510).

As shown in FIG. 14, at the pilot pressure Ti ranging from the second pilot threshold T2 (T2=85%) to the third pilot threshold T3 (T3=100%) (85%≤Ti<100%), the controller 5 increases the minimum displacement volume Qmin of the HST motor 42 so as to maintain the increase Qup in the minimum displacement volume of the HST motor 42 to be the predetermined value Qup1 irrespective of increase in pilot pressure Ti, and limits the vehicle speed (decreases the speed).

As described above, if it is determined that the forward and reverse switching signal indicates forward travel and the pilot pressure Ti of the lift arm 21 in the lifting direction is equal to or higher than the minimum value Ti_min of the pilot pressure (Ti≥Ti_min), that is, the specific condition is satisfied (in the raise and run operation) in step S502 (step S502/YES), the minimum displacement volume Qmin of the HST motor 42 is increased from Qmin1 to Qmin2 (Qmin1→Qmin2, Qmin2>Qmin1) as shown in FIG. 15, thereby limiting the vehicle speed of the wheel loader 1 from Smax1 to Smax2 (Smax1→Smax2, Smax2<Smax1) as shown in FIG. 16.

Consequently, if the specific condition is satisfied, that is, in the raise and run operation, the vehicle speed is limited with respect to the lifting operation rate of the lift arm 21, which can reduce the traveling distance from the wheel loader 1 to the dump truck 100B (the distance from the wheel loader 1 indicated by solid lines to the wheel loader 1 indicated by broken lines in FIG. 2) in comparison with the case where the vehicle speed is not limited.

This is because without any limitation on the vehicle speed with respect to the lifting operation rate of the lift arm 21, the wheel loader 1 possibly reaches the front of the dump truck 100B before the lift arm 21 has been completely lifted in the upper direction. In this case, the traveling distance is required to be long. However, by the controller 5 limiting (reducing) the vehicle speed in consideration of the lifting operation rate of the lift arm 21, the lift arm 21 can be completely lifted even with a small traveling distance. Accordingly, the cycle time of the operation of V-shaped loading is reduced, which improves the operation efficiency and also improves the fuel consumption of the wheel loader 1.

To determine whether the specific condition is satisfied or not, presence or absence of the lifting operation for the lift arm 21 is determined using the pilot pressure Ti detected by the operation amount sensor 73. Consequently, in comparison with the case of detecting the bottom pressure of the lift arm cylinders 22, erroneous determinations of the lifting operation for the lift arm 21 can be reduced, and abrupt change in vehicle speed is suppressed. This is because of the following reasons. Unlike the case of using the bottom pressure of the lift arm cylinders 22, use of the pilot pressure generated by operating the lift arm operating lever 210 can directly detect the lifting operation for the lift arm 21. Accordingly, adverse effects of variation in pressure due to a load in the bucket 23 and vibrations of the vehicle body are small.

Furthermore, in this embodiment, only during the latter half of the raise and run operation, that is, at least while the lift arm 21 is completely lifted in the upper direction from the horizontal attitude (during the pilot pressure Ti of 70% to 100% in FIG. 14), the vehicle speed is limited by the controller 5. Consequently, this tends to conform with the sense of the operator that the more the lifting operation amount for the lift arm 21 is, the slower the vehicle speed is. Accordingly, the operator's feeling of strangeness can be reduced.

During the pilot pressure Ti of 70% to 85% (T1≤Ti<T2), as the higher the pilot pressure Ti increases, the increase Qup in the minimum displacement volume of the HST motor 42 gradually becomes larger. Accordingly, the vehicle speed is smoothly limited. Vibrations and shocks on the vehicle body and the operator accompanied by abrupt reduction in speed can be further suppressed.

If it is not determined that the pilot pressure Ti is equal to or higher than the second pilot threshold T2 and is lower than the third pilot threshold T3 (T2≤Ti<T3) in step S508 (step S508/N0), that is, if the lift arm 21 is not subjected to a large lifting operation (Ti<T1), or if the raise and run operation has been completely finished (Ti=T3), the processes in the controller 5 are finished.

After the command signal output section 55 outputs the command signal to the motor regulator 420 in step S510, the processing returns to step S501, and the processes are repeated.

This embodiment is configured such that if the speed stage is not the low speed stage in step S504 (step S504/N0), the processing returns to step S503, and does not proceed to the process of controlling the minimum displacement volume Qmin of the HST motor 42 to limit the vehicle speed (the processes in step S506 and thereafter) until the speed stage becomes the low speed stage. The low speed stage (in particular, the second speed stage in FIG. 7) is suitable for the raise and run operation. It is desirable to limit the vehicle speed only when the low speed stage is selected.

Note that the controller 5 may omit steps S503 and S504, and control the minimum displacement volume Qmin of the HST motor 42 irrespective of the type of the selected speed stage.

In this embodiment, the wheel loader 1 includes an adjustment device 65 as shown in FIG. 12. The adjustment device 65 allows the operator to adjust freely the change rate of the minimum displacement volume Qmin of the HST motor 42 with respect to the pilot pressure Ti. The controller 5 stores the change rate preset by the adjustment device 65 in the storage section 52, and the calculation section 54 calculates the minimum displacement volume Qmin of the HST motor 42 in conformity with the stored change rate.

For example, if it is intended not to limit the vehicle speed too much, the adjustment device 65 configures setting such that the change rate of the increase Qup in the minimum displacement volume of the HST motor 42 with respect to the pilot pressure Ti is reduced, as indicated by chain lines in FIGS. 14 and 16. On the contrary, if it is intended to limit largely the vehicle speed, the adjustment device 65 configures setting such that the change rate of the increase Qup in the minimum displacement volume of the HST motor 42 with respect to the pilot pressure Ti is increased, as indicated by chain double-dashed lines in FIGS. 14 and 16.

As described above, the wheel loader 1 is provided with the adjustment device 65, which can freely adjust the limit on the vehicle speed in conformity with the preferences of the operator, the environment of the field site, etc., and improve the user-friendliness.

Note that in this embodiment, the vehicle speed is limited by increasing the minimum displacement volume Qmin of the HST motor 42. Without limitation thereto, the vehicle speed can be limited by reducing the maximum displacement volume of the HST pump 41.

In this case, in step S507 shown in FIG. 13, the calculation section 54 calculates the maximum displacement volume Qmax of the HST pump 41 such that as the pilot pressure Ti increases, the reduction Qdown of the maximum displacement volume of the HST pump 41 increases from zero to a predetermined value Qdown1 (0<Qdown1). In step S509, the calculation section 54 calculates the maximum displacement volume Qmax of the HST pump 41 such that irrespective of increase in pilot pressure Ti, the reduction Qdown in the maximum displacement volume of the HST pump 41 is maintained to be the predetermined value Qdown1.

Second Embodiment

Next, a wheel loader 1 according to a second embodiment of the present invention is described with reference to FIGS. 17 to 20. In FIGS. 17 to 20, configuration elements common to those described on the wheel loader 1 according to the first embodiment are assigned the same symbols. The description thereof is omitted.

Figure 17:
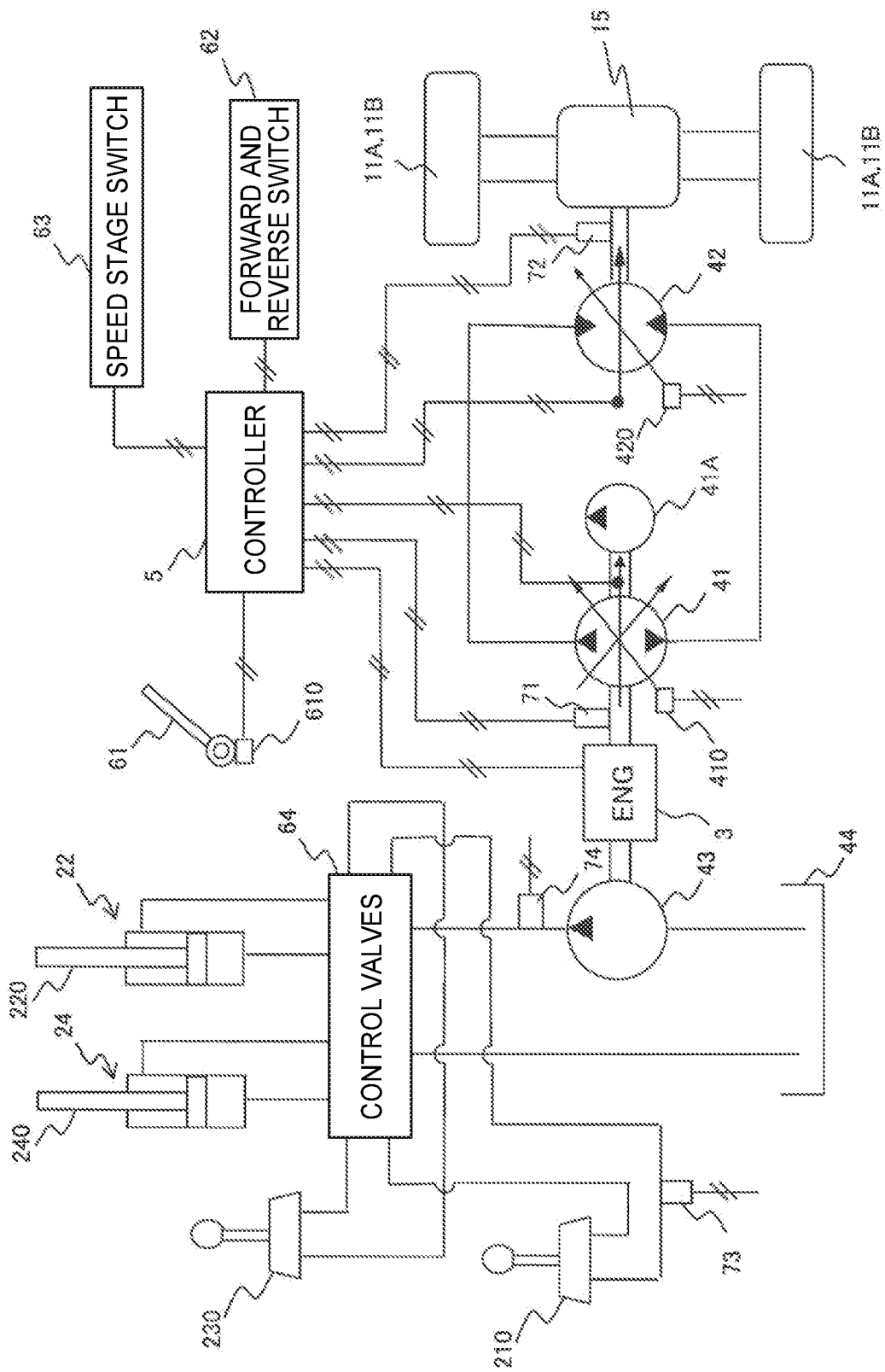
FIG. 17 shows a hydraulic circuit and an electric circuit of the wheel loader according to a second embodiment.
Figure 18:
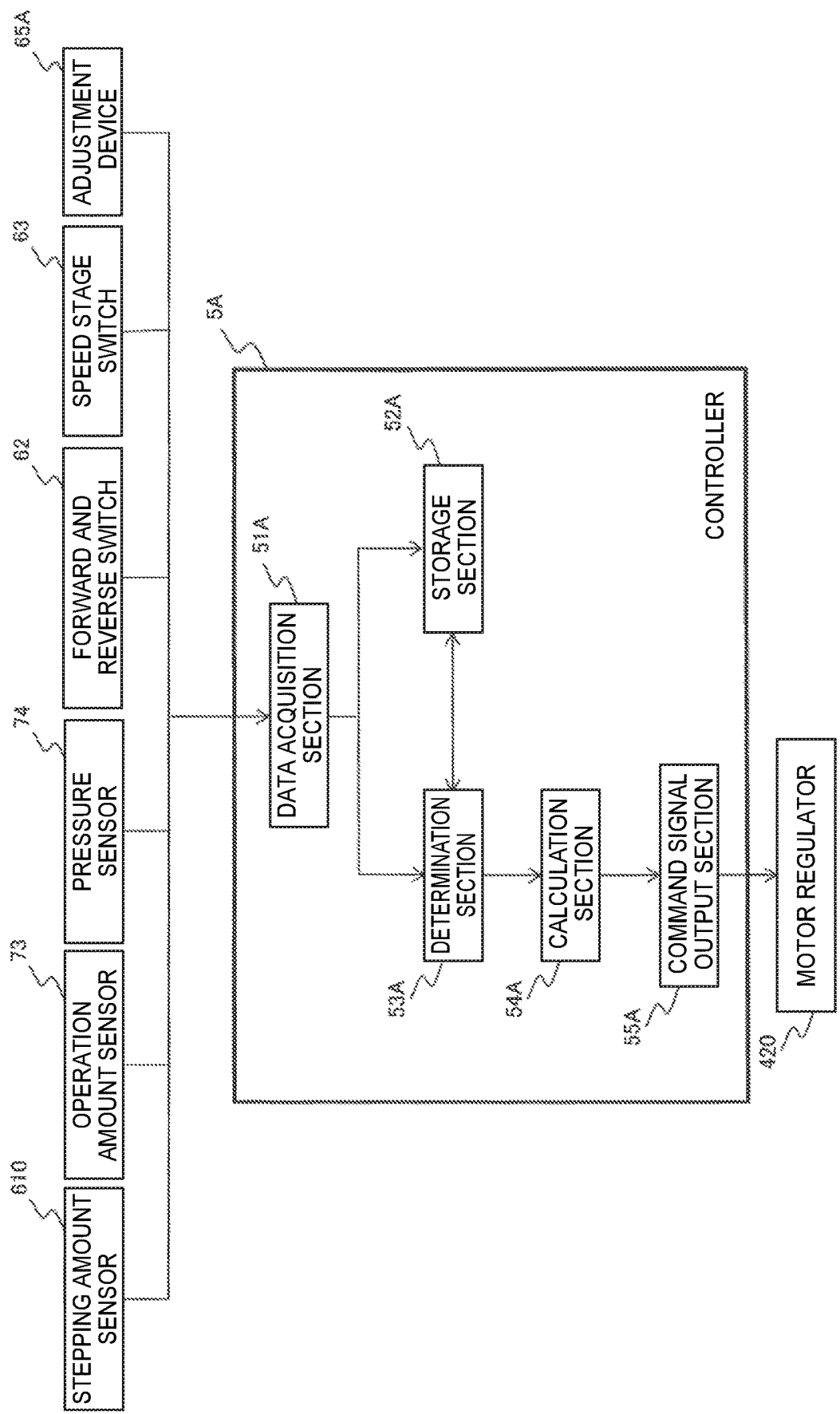
FIG. 18 is a functional block diagram showing functions that a controller according to the second embodiment has.
Figure 19:
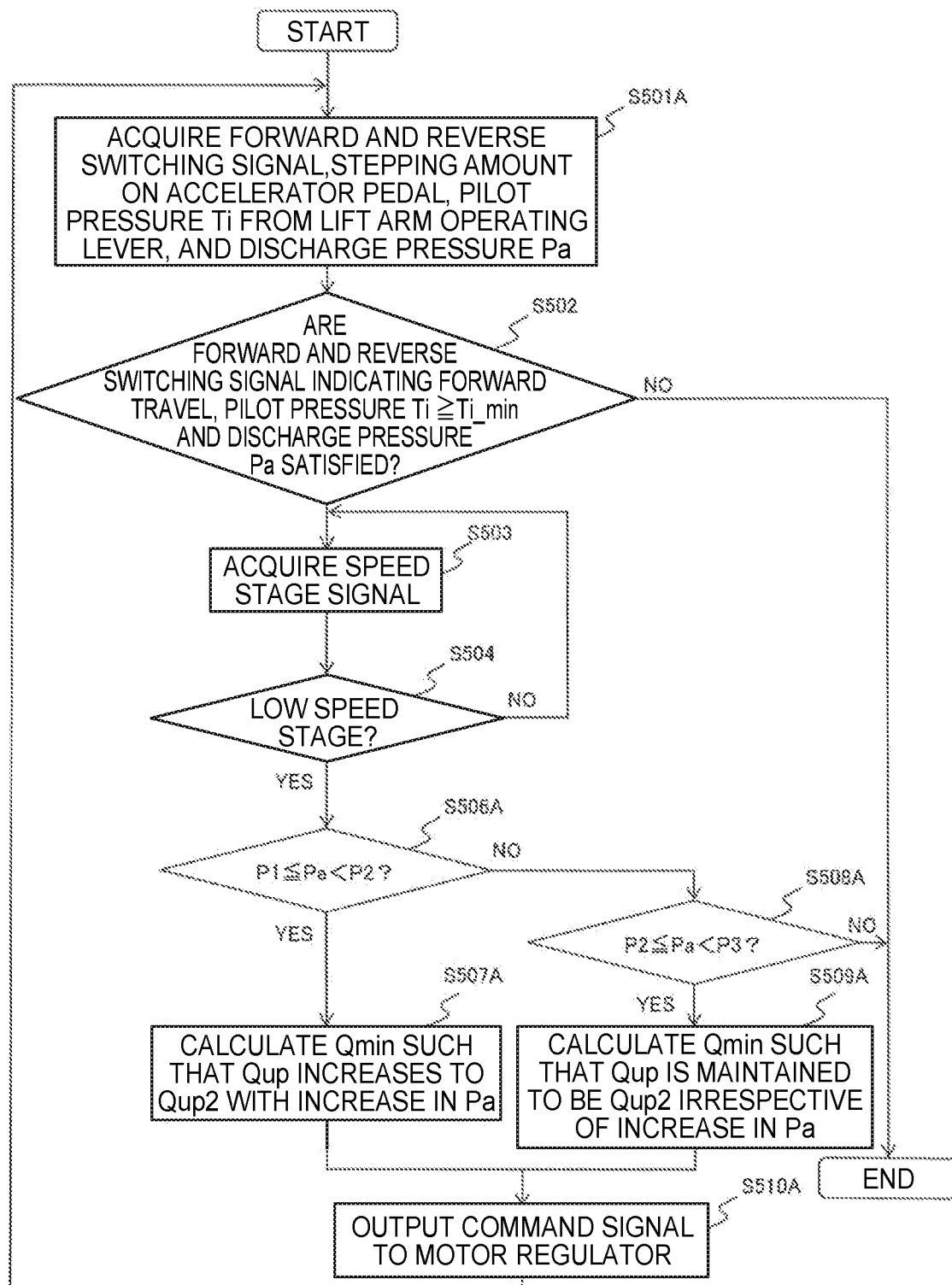
FIG. 19 is a flowchart showing the flow of processes executed by the controller according to the second embodiment.
Figure 20:
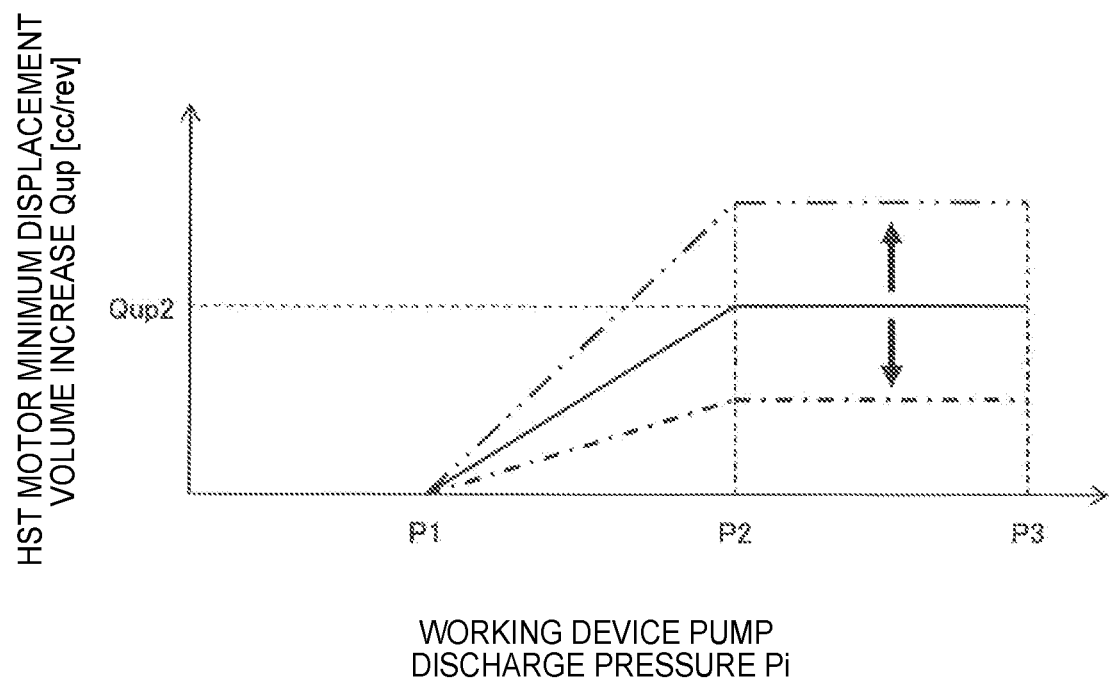
FIG. 20 is a graph showing the relationship between the discharge pressure of the working device hydraulic pump and the increase in the minimum displacement volume of the HST motor.

FIG. 17 shows a hydraulic circuit and an electric circuit of the wheel loader 1 according to the second embodiment. FIG. 18 is a functional block diagram showing functions that a controller 5A according to the second embodiment has. FIG. 19 is a flowchart showing the flow of processes executed by the controller 5A according to the second embodiment. FIG. 20 is a graph showing the relationship between the discharge pressure Pa of the working device hydraulic pump 43 and the increase Qup in the minimum displacement volume of the HST motor.

As shown in FIG. 17, the wheel loader 1 according to this embodiment includes a pressure sensor 74 that detects the discharge pressure of the working device hydraulic pump 43. Similar to the first embodiment, the travel drive system in this embodiment is an HST travel drive system.

As shown in FIGS. 18 and 19, in the controller 5A according to this embodiment, a data acquisition section 51A acquires not only the forward and reverse switching signal output from the forward and reverse switch 62, the stepping amount detected by the stepping amount sensor 610, the pilot pressure Ti detected by the operation amount sensor 73, and the speed stage signal output from the speed stage switch 63, but also data pertaining to the discharge pressure Pa of the working device hydraulic pump 43 output from the pressure sensor 74 (step S501A).

Next, in step S502, the determination section 53A determines whether or not the forward and reverse switching signal indicates forward travel and the pilot pressure Ti of the lift arm 21 in the lifting direction is equal to or higher than the minimum value Ti_min of the pilot pressure (Ti≥Ti_min), and the discharge pressure Pa is equal to or higher than a first pump threshold P1 (Pa≥P1), that is, whether the specific condition is satisfied or not. As described above, the determination section 53A determines whether the lift arm 21 is performing the lifting operation or not on the basis not only of the pilot pressure Ti detected by the operation amount sensor 73 but also of the discharge pressure Pa of the working device hydraulic pump 43 detected by the pressure sensor 74.

As described above, for determination of the lifting operation for the lift arm 21, use of the pilot pressure Ti and the discharge pressure Pa of the working device hydraulic pump 43 can further reduce erroneous determinations of the lifting operation for the lift arm 21, in comparison with the case of determining the lifting operation for the lift arm 21 using only the pilot pressure Ti.

A storage section 52A stores the first pump threshold P1, a second pump threshold P2 and a third pump threshold P3 that pertain to the discharge pressure of the working device hydraulic pump 43 and are required when the lift arm 21 lifts the bucket 23 in a state of being loaded. The first pump threshold P1 is the discharge pressure of the working device hydraulic pump 43 when the lift arm 21 starts the operation of lifting upward the bucket 23 in the state of being loaded. The second pump threshold P2 is the discharge pressure of the working device hydraulic pump 43 when the lift arm 21 is in a horizontal attitude. The third pump threshold P3 is the discharge pressure of the working device hydraulic pump 43 when the lift arm 21 has been completely lifted in the upper direction, that is relief pressure.

The determination section 53A determines the magnitude relationship between the discharge pressure Pa acquired in step S501A and the first pump threshold P1 and second pump threshold P2 read from the storage section 52A. Specifically, the determination section 53A determines whether or not the discharge pressure Pa is equal to or higher than the first pump threshold P1 and is lower than the second pump threshold P2 (step S506A).

If it is determined that the discharge pressure Pa is equal to or higher than the first pump threshold P1 and is lower than the second pump threshold P2 (P1≤Pa<P2) in step S506A (step S506A/YES), the calculation section 54A calculates the minimum displacement volume Qmin of the HST motor 42 such that the discharge pressure Pa of the working device hydraulic pump 43 and the increase Qup in the minimum displacement volume of the HST motor 42 have a proportional relationship (step S507A).

The command signal output section 55A then outputs a command signal in conformity with the minimum displacement volume Qmin of the HST motor 42 calculated in step S507A, to the motor regulator 420 (step S510A).

As shown in FIG. 20, from a time of starting the lifting operation for the lift arm 21 (the first pump threshold P1) to a time when the lift arm 21 reaches the horizontal attitude (the second pump threshold P2), the controller 5A increases the minimum displacement volume Qmin of the HST motor 42 such that as the discharge pressure Pa of the working device hydraulic pump 43 increases, the increase Qup in the minimum displacement volume of the HST motor 42 increases to a predetermined value Qup2 (0<Qup1), and limits the vehicle speed (decreases the speed).

On the contrary, if it is not determined that the discharge pressure Pa is equal to or higher than the first pump threshold P1 and is lower than the second pump threshold P2 (P1≤Pa<P2) in step S506A (step S506A/NO), the determination section 53A further determines whether or not the discharge pressure Pa is equal to or higher than the second pump threshold P2 and is lower than the third pump threshold P3 (step S508A).

If it is determined that the discharge pressure Pa is equal to or higher than the second pump threshold P2 and is lower than the third pump threshold P3 (P2≤Pa<P3) in step S508A (step S508A/YES), the calculation section 54A calculates the minimum displacement volume Qmin of the HST motor 42 such that irrespective of increase in the discharge pressure Pa, the increase Qup in the minimum displacement volume of the HST motor 42 is maintained to be a predetermined value Qup2 (step S509A).

The command signal output section 55A then outputs a command signal in conformity with the minimum displacement volume Qmin of the HST motor 42 calculated in step S509A, to the motor regulator 420 (step S510A).

As shown in FIG. 20, from a time when the lift arm 21 is in the horizontal attitude (the second pump threshold P2) to a time when the lift arm 21 is completely lifted in the upper direction (the third pump threshold P3), the controller 5A increases the minimum displacement volume Qmin of the HST motor 42 such that irrespective of increase in the discharge pressure Pa of the working device hydraulic pump 43, the increase Qup in the minimum displacement volume of the HST motor 42 is maintained to be the predetermined value Qup2, and limits the vehicle speed (decreases the speed).

As described above, if the specific condition is satisfied, the controller 5A may control the minimum displacement volume of the HST motor 42 (or the maximum displacement volume of the HST pump 41) in response to increase in the discharge pressure Pa of the working device hydraulic pump 43, and limit the vehicle speed. This case is not necessarily with the discharge pressure Pa of the working device hydraulic pump 43. Alternatively, the vehicle speed may be limited in response to increase in the input torque of the working device hydraulic pump 43.

The controller 5A thus limits the vehicle speed on the basis of the discharge pressure Pa of the working device hydraulic pump 43 detected by the pressure sensor 74 (the input torque of the working device hydraulic pump 43). Without limitation thereto, the vehicle speed may be limited on the basis of the average discharge pressure Pav (average input torque) in a predetermined setting time period. In this case, even if the detected value varies due to occurrence of instantaneous large vibrations, collision or the like at the vehicle body, the vehicle speed can be stably limited using the average value.

In this embodiment, in the former half of the raise and run operation, that is, from a time of the start of the lifting operation for the lift arm 21 to a time when the lift arm 21 reaches the horizontal attitude, the controller 5A controls the minimum displacement volume of the HST motor 42 such that as the discharge pressure Pa of the working device hydraulic pump 43 increases, the increase Qup in the minimum displacement volume of the HST motor 42 gradually increases. Accordingly, the vehicle speed is smoothly limited, and the vibrations and shocks on the vehicle body and the operator accompanied by abrupt reduction in speed can be suppressed.

As shown in FIG. 18, similar to the first embodiment, the wheel loader 1 according to this embodiment may include an adjustment device 65A that can adjust the change rate of the minimum displacement volume Qmin of the HST motor 42 with respect to the discharge pressure Pa of the working device hydraulic pump 43. Accordingly, as indicated by chain lines and chain double-dashed lines in FIG. 20, the limitation on the vehicle speed can be freely adjusted in conformity with the preferences of the operator, the environment of the field site, etc.

Third Embodiment

Figure 21:
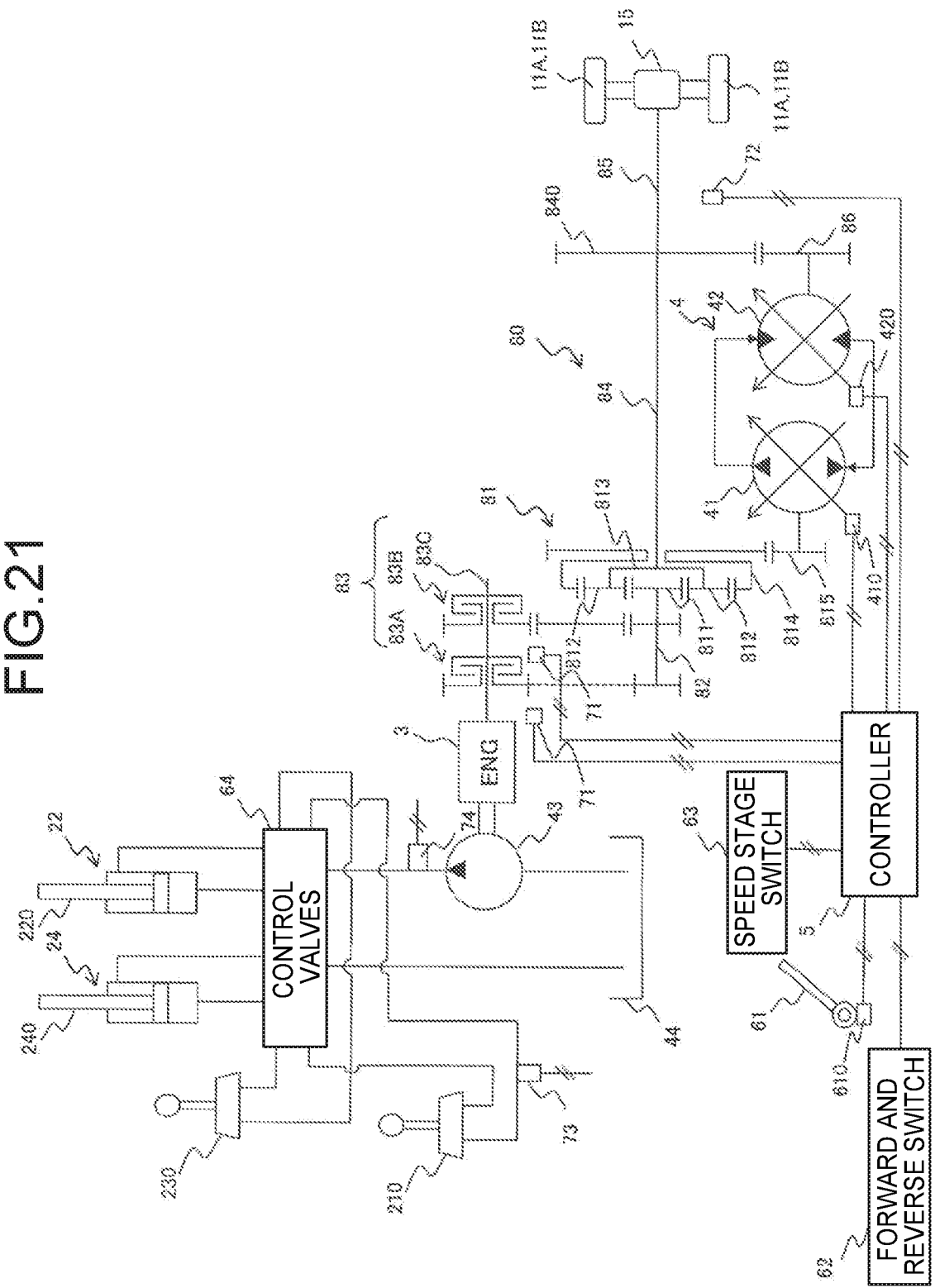
FIG. 21 shows a hydraulic circuit and an electric circuit of the wheel loader according to a third embodiment.

Next, a wheel loader 1 according to a third embodiment of the present invention is described with reference to FIG. 21. In FIG. 21, configuration elements common to those described on the wheel loaders 1 according to the first and second embodiments are assigned the same symbols. The description thereof is omitted.

FIG. 21 shows a hydraulic circuit and an electric circuit of the wheel loader 1 according to the third embodiment.

Traveling of the vehicle body of the wheel loader 1 according to this embodiment is controlled by an HMT travel drive system. This HMT travel drive system includes: an HST 4 that includes an HST pump 41 and an HST motor 42 communicating with each other in a closed circuit manner; and a mechanical transmission 80. The drive force of the engine 3 is transmitted to the HST 4 and the mechanical transmission 80 in parallel via a planetary gear mechanism 81.

The planetary gear mechanism 81 includes: a sun gear 811 fixed to an input shaft 82; a plurality of planetary gears 812 meshed with the outer periphery of the sun gear 811; a planetary carrier 813 that pivotally supports the planetary gears 812; a ring gear 814 meshed with the outer peripheries of the planetary gears 812; and a pump input gear 815 meshed with the outer periphery of the ring gear 814.

The output torque of the engine 3 is transmitted to the input shaft 82 via a clutch device 83 that includes a forward hydraulic clutch 83A, a rear hydraulic clutch 83B and a clutch shaft 83C, and is transmitted from the input shaft 82 to the planetary gear mechanism 81.

Here, the planetary carrier 813 of the planetary gear mechanism 81 is fixed to an output shaft 84. Accordingly, the drive force of the engine 3 is transmitted to the mechanical transmission 80. The drive force of the engine 3 transmitted to the mechanical transmission 80 is transmitted to the axle 15 via a propeller shaft 85 connected to the output shaft 84, thereby driving the front wheels 11A and the rear wheels 11B.

The pump input gear 815 of the planetary gear mechanism 81 is fixed to a rotation shaft of the HST pump 41. The drive force of the engine 3 is transmitted also to the HST 4. A motor output gear 86 is fixed to the rotation shaft of the HST motor 42. The motor output gear 86 is meshed with a gear 840 of the output shaft 84. Accordingly, the drive force of the engine 3 transmitted to the HST 4 is also transmitted to the axle 15 via the propeller shaft 85 connected to the output shaft 84, thereby driving the front wheels 11A and the rear wheels 11B.

As described above, the HST 4 and the mechanical transmission 80 are combined to each other to constitute a variable speed gearbox, which can improve the transmission efficiency in comparison with the HST travel drive system described in the first embodiment. Note that FIG. 14 shows the divided-input HMT travel drive system that inputs the output of the planetary gear mechanism 81 into the HST 4. Without limitation thereto, a divided-output HMT travel drive system that inputs the output of the HST 4 into the planetary gear mechanism 81 may be adopted.

Also in this embodiment, similar to the first and second embodiments, when the specific condition is satisfied, the controller 5 limits the vehicle speed by increasing the minimum displacement volume Qmin of the HST motor 42 in response to the increase in the lifting operation amount for the lift arm 21 (pilot pressure), or the increase in the discharge pressure of the working device hydraulic pump 43. Accordingly, operations and advantageous effects similar to the operations and advantageous effects described in the first and second embodiments can be achieved.

Fourth Embodiment

Figure 22:
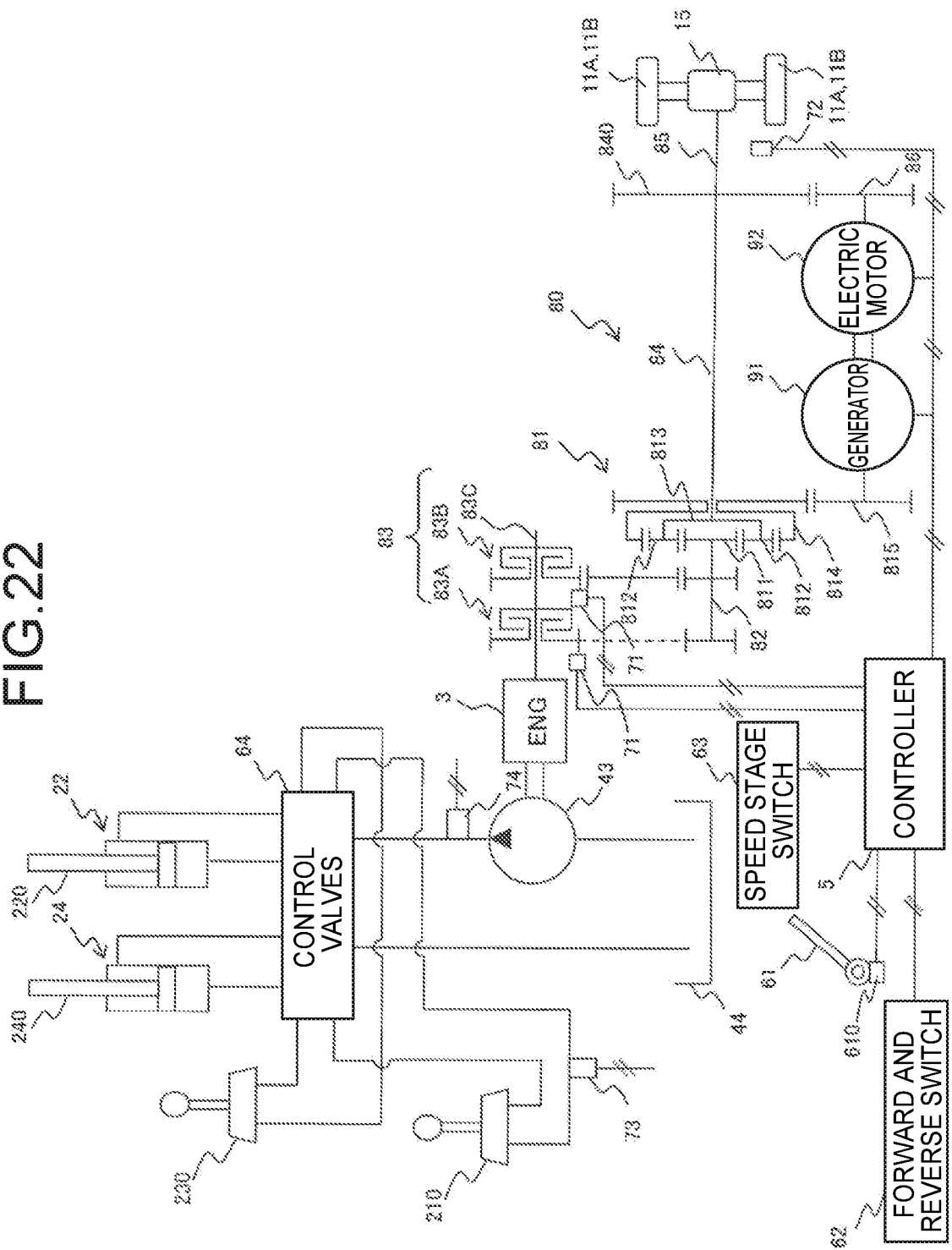
FIG. 22 shows a hydraulic circuit and an electric circuit of the wheel loader according to a fourth embodiment.

Next, a wheel loader 1 according to a fourth embodiment is described with reference to FIG. 22. In FIG. 22, configuration elements common to those described on the wheel loaders 1 according to the first to third embodiments are assigned the same symbols. The description thereof is omitted.

FIG. 22 shows a hydraulic circuit and an electric circuit of the wheel loader 1 according to the fourth embodiment.

Traveling of the vehicle body of the wheel loader 1 according to this embodiment is controlled by an EMT travel drive system. This EMT travel drive system is the HMT travel drive system described above where a generator 91 is provided instead of the HST pump 41, and an electric motor 92 is provided instead of the HST motor 42.

In this embodiment, when the specific condition is satisfied, the controller limits the vehicle speed by reducing the number of revolutions of the electric motor 92 in response to the increase in the lifting operation amount for the lift arm 21 (pilot pressure) or the increase in the discharge pressure of the working device hydraulic pump 43. Note that the number of revolutions of the electric motor 92 is controlled by changing the current value or voltage value to the electric motor 92. Also in this embodiment, operations and advantageous effects similar to the operations and advantageous effects described in the first and second embodiments can be achieved.

The embodiments of the present invention have thus been described above. Note that the present invention is not limited to the embodiments described above, and encompasses various modification examples. For example, the aforementioned embodiments are detailed description for illustrating the present invention in an understandable manner, and does not necessarily impose limitation to those including the entire configuration described above. A part of the configuration of each of the embodiments can be replaced with configuration elements of another embodiment. To the configurations of the embodiments, configuration elements of another embodiment can be added. Alternatively, a part of the configuration of the embodiment can be subjected to addition, removal and replacement of other configuration elements.

For example, in the embodiments described above, when the lift arm 21 does not largely perform the lifting operation (for example, when the lift arm 21 is positioned lower than the lift arm 21 in the horizontal attitude), the controllers 5 and 5A are thus configured to finish the process of limiting the vehicle speed. However, the configuration is not necessarily required. If the specific condition is at least satisfied, the controllers 5 and 5A perform the process of limiting the vehicle speed.

REFERENCE SIGNS LIST

1: Wheel loader
2: Front working device
3: Engine
5, 5A: Controller
11A: Front wheel
11B: Rear wheel
21: Lift arm
41: HST pump (traveling hydraulic pump)
42: HST motor (traveling hydraulic motor)
43: Working device hydraulic pump
62: Forward and reverse switch (traveling state sensor)
63: Speed stage switch
65, 65A: Adjustment device
73: Operation amount sensor
74: Pressure sensor
91: Generator
92: Electric motor
100B: Dump truck
610: Stepping amount sensor (traveling state sensor)

The invention claimed is:

1. A wheel loader including a front working device including a lift arm provided at a front of a vehicle body and rotatable in a vertical direction, comprising:
an engine;
a variable displacement traveling hydraulic pump driven by the engine;

a variable displacement traveling hydraulic motor connected to the traveling hydraulic pump through a closed circuit to transmit driving force of the engine to wheels;
a traveling state sensor that detects a traveling state of the vehicle body;
an operation amount sensor that detects a lifting operation amount of the lift arm; and
a controller that controls the traveling hydraulic pump and the traveling hydraulic motor,
wherein the controller
determines whether a specific condition for specifying an operation of the lift arm in an upper direction during forward travel of the vehicle body is satisfied or not, based on the traveling state detected by the traveling state sensor, and on the lifting operation amount of the lift arm detected by the operation amount sensor, and
limits a vehicle speed by decreasing a displacement volume of the traveling hydraulic pump or increasing a displacement volume of the traveling hydraulic motor as the lifting operation amount of the lift arm increases in a case of the specific condition being satisfied and only while the lift arm is completely lifted in the upper direction from a state of having a horizontal attitude which corresponds to a latter half of a raise and run operation.

2. The wheel loader according to claim 1, further comprising:
a working device hydraulic pump that is driven by the engine and supplies the front working device with hydraulic oil; and
a pressure sensor that detects a discharge pressure of the working device hydraulic pump,
wherein the controller determines whether the specific condition is satisfied or not, based on the lifting operation amount of the lift arm detected by the operation amount sensor, and on the discharge pressure according to the lifting operation of the lift arm detected by the pressure sensor, and
limits the vehicle speed by decreasing the displacement volume of the traveling hydraulic pump or increasing the displacement volume of the traveling hydraulic motor in response to increase in the discharge pressure of the working device hydraulic pump or increase in an input torque of the working device hydraulic pump, in a case of the specific condition being satisfied and only while the lift arm is completely lifted in the upper direction from the state of having the horizontal attitude which corresponds to the latter half of the raise and run operation.

3. The wheel loader according to claim 1,
wherein only in a case of a low speed stage selected for travel toward a dump truck in a loading operation, the controller limits the vehicle speed by decreasing the displacement volume of the traveling hydraulic pump or increasing the displacement volume of the traveling hydraulic motor.

4. The wheel loader according to claim 1, further comprising
an adjustment device that adjusts a change rate of the displacement volume of the traveling hydraulic pump, or a change rate of the displacement volume of the traveling hydraulic motor, with respect to the lifting operation amount of the lift arm,
wherein according to the change rate set by the adjustment device, the controller limits the vehicle speed by decreasing the displacement volume of the traveling hydraulic pump or increasing the displacement volume of the traveling hydraulic motor.

5. A wheel loader including a front working device including a lift arm provided at a front of a vehicle body and rotatable in a vertical direction, comprising:
an engine;
a generator driven by the engine;
an electric motor that is connected to the generator, and transmits a drive force of the engine to wheels;
a traveling state sensor that detects a traveling state of the vehicle body;
an operation amount sensor that detects a lifting operation amount of the lift arm; and
a controller that controls the electric motor,
wherein the controller
determines whether a specific condition for specifying an operation of the lift arm in an upper direction during forward travel of the vehicle body is satisfied or not, based on the traveling state detected by the traveling state sensor, and on the lifting operation amount of the lift arm detected by the operation amount sensor, and
limits the vehicle speed by reducing the number of revolutions of the electric motor as the lifting operation amount of the lift arm increases, in a case of the specific condition being satisfied and only while the lift arm is completely lifted in the upper direction from a state of having a horizontal attitude which corresponds to a latter half of a raise and run operation.

* * * * *